(12) United States Patent
Wetherbee et al.

(10) Patent No.: US 11,367,018 B2
(45) Date of Patent: Jun. 21, 2022

(54) AUTONOMOUS CLOUD-NODE SCOPING FRAMEWORK FOR BIG-DATA MACHINE LEARNING USE CASES

(71) Applicant: ORACLE INTERNATIONAL CORPORATION, Redwood Shores, CA (US)

(72) Inventors: Edward R. Wetherbee, Omaha, NE (US); Kenny C. Gross, Escondido, CA (US); Guang C. Wang, San Diego, CA (US); Matthew T. Gerdes, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 16/732,558

(22) Filed: Jan. 2, 2020

(65) Prior Publication Data
US 2021/0174248 A1    Jun. 10, 2021

Related U.S. Application Data

(60) Provisional application No. 62/943,411, filed on Dec. 4, 2019.

(51) Int. Cl.
*G06F 15/177* (2006.01)
*G06N 20/00* (2019.01)
(Continued)

(52) U.S. Cl.
CPC ............. *G06N 20/00* (2019.01); *G06N 20/10* (2019.01); *H04L 41/0883* (2013.01);
(Continued)

(58) Field of Classification Search
CPC ..... G06N 20/10; H04L 41/0883; H04L 41/16; H04L 41/22; H04L 67/10; H04L 67/12
See application file for complete search history.

(56) References Cited

U.S. PATENT DOCUMENTS 7,020,802 B2    3/2006  Gross et al.
7,613,576 B2   11/2009  Gross et al.
(Continued)

FOREIGN PATENT DOCUMENTS

CN    107 181 543 A    9/2017
CN    107181543        9/2017
CN    110 941 020 A    3/2020

OTHER PUBLICATIONS

1st NF OA from U.S. Appl. No. 16/804,531, filed Feb. 28, 2020, dated Jul. 20, 2021, 51 pgs.
(Continued)

*Primary Examiner* — Padma Mundur
(74) *Attorney, Agent, or Firm* — Kraguljac Law Group, LLC

(57) ABSTRACT

Systems, methods, and other embodiments associated with autonomous cloud-node scoping for big-data machine learning use cases are described. In some example embodiments, an automated scoping tool, method, and system are presented that, for each of multiple combinations of parameter values, (i) set a combination of parameter values describing a usage scenario, (ii) execute a machine learning application according to the combination of parameter values on a target cloud environment, and (iii) measure the computational cost for the execution of the machine learning application. A recommendation regarding configuration of central processing unit(s), graphics processing unit(s), and memory for the target cloud environment to execute the machine learning application is generated based on the measured computational costs.

17 Claims, 15 Drawing Sheets

(51) Int. Cl.
  *H04L 41/08* (2022.01)
  *H04L 41/16* (2022.01)
  *H04L 67/10* (2022.01)
  *H04L 41/22* (2022.01)
  *H04L 67/12* (2022.01)
  *G06N 20/10* (2019.01)

(52) U.S. Cl.
  CPC .............. *H04L 41/16* (2013.01); *H04L 41/22* (2013.01); *H04L 67/10* (2013.01); *H04L 67/12* (2013.01)

(56) References Cited

U.S. PATENT DOCUMENTS

| | | |
|---|---|---|
| 7,613,580 B2 | 11/2009 | Gross et al. |
| 7,702,485 B2 | 4/2010 | Gross et al. |
| 7,869,977 B2 | 1/2011 | Lewis et al. |
| 8,055,594 B2 | 11/2011 | Dhanekula et al. |
| 8,069,490 B2 | 11/2011 | Gross et al. |
| 8,275,738 B2 | 9/2012 | Gross et al. |
| 8,341,759 B2 | 12/2012 | Gross et al. |
| 8,457,913 B2 | 6/2013 | Zwinger et al. |
| 8,543,346 B2 | 9/2013 | Gross et al. |
| 10,452,510 B2 | 10/2019 | Gross et al. |
| 10,496,084 B2 | 12/2019 | Li et al. |
| 2008/0252309 A1 | 10/2008 | Gross et al. |
| 2008/0256398 A1 | 10/2008 | Gross et al. |
| 2009/0077351 A1* | 3/2009 | Nakaike ................ G06F 9/4893 712/220 |
| 2009/0099830 A1 | 4/2009 | Gross et al. |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0305892 A1 | 12/2010 | Gross et al. |
| 2010/0306165 A1 | 12/2010 | Gross et al. |
| 2012/0030775 A1 | 2/2012 | Gross et al. |
| 2013/0157683 A1 | 6/2013 | Lymberopoulos et al. |
| 2014/0354300 A1 | 12/2014 | Ramachandran et al. |
| 2015/0137830 A1 | 5/2015 | Keller, III et al. |
| 2016/0097833 A1 | 4/2016 | Han et al. |
| 2016/0098561 A1 | 4/2016 | Keller et al. |
| 2018/0011130 A1 | 1/2018 | Aguayo Gonzalez et al. |
| 2018/0060203 A1 | 3/2018 | Gupta et al. |
| 2018/0276044 A1* | 9/2018 | Fong ..................... G06F 9/5016 |
| 2018/0349797 A1 | 12/2018 | Garvey et al. |
| 2019/0196892 A1 | 6/2019 | Matei et al. |
| 2019/0197045 A1 | 6/2019 | Kraljevic et al. |
| 2019/0197145 A1 | 6/2019 | Gross et al. |
| 2019/0243799 A1 | 8/2019 | Gross et al. |
| 2019/0286725 A1 | 9/2019 | Gawlick et al. |
| 2019/0378022 A1 | 12/2019 | Wang et al. |
| 2020/0387753 A1* | 12/2020 | Brill ....................... G06N 20/00 |
| 2021/0158202 A1 | 5/2021 | Backlawski et al. |
| 2021/0174248 A1 | 6/2021 | Wetherbee et al. |

OTHER PUBLICATIONS

Wang, Ray C., et al., Process Fault Detection Using Time-Explicit Kiviat Diagrams. AlChE Journal 61.12 (2015) 4277-4293.

Abran et al.; Estimation Models Based on Functional Profiles. Intl. Workshop on Software Measurement-IWSM/MetriKon, Kronisburg (Germany), Shaker Verlag. 2004 (Year: 2004).

Gou, Yuhua, "Implementation of 3d Kiviat Diagrams." (2008). (Year: 2008).

Patent Cooperation Treaty (PCT) International Search Report and Written Opinion of the International Searching Authority in PCT International Application No. PCT/US2020/060083, International filing date Nov. 12, 2020 (Nov. 12, 2020), dated Mar. 19, 2021 (dated Mar. 19, 2021), 13 pgs.

Garcia-Martin Eva et al., "Estimation of Energy Consumption in Machine Learning," Journal of Parallel and Distributed Computing, Elsevier, Amsterdam, NL, vol. 134, Aug. 21, 2019 (Aug. 21, 2019), pp. 77-88.

Patent Cooperation Treaty (PCT) International Search Report and Written Opinion of the International Searching Authority in PCT International Application No. PCT/US2021/015359, International filing date Jan. 28, 2021 (Jan. 28, 2021), dated Apr. 9, 2021 (dated Apr. 9, 2021), 34 pgs.

1st NF OA dated May 21, 2021 from U.S. Appl. No. 16/820,807, filed Mar. 17, 2020, dated May 21, 2021, 36 pgs.

Deepika et al., Design & development of location identification using RFID with Wi-Fi positioning systems, 2017 Ninth Intl. Conference on Ubiquitous and Future Networks (ICUFN). IEEE, 2017) 6 pgs.

Patent Cooperation Treaty (PCT) International Search Report and Written Opinion of the International Searching Authority in PCT International Application No. PCT/US2021/015802, International filing date Jan. 29, 2021 (Jan. 29, 2021), dated May 28, 2021 (dated May 28, 2021), 13 pgs.

Patent Cooperation Treaty (PCT) International Search Report and Written Opinion of the International Searching Authority in PCT International Application No. PCT/US2021/013633, International filing date Jan. 15, 2021 (Jan. 15, 2021), dated May 6, 2021 (dated May 6, 2021), 10 pgs.

Patent Cooperation Treaty (PCT) International Search Report and Written Opinion of the International Searching Authority in PCT International Application No. PCT/US2021/014106, International filing date Jan. 20, 2021 (Jan. 20, 2021), dated Apr. 26, 2021 (Apr. 26, 2021), 11 pgs.

Huang H, et al. "Electronic counterfeit detection based on the measurement of electromagnetic fingerprint," Microelectronics Reliability: An Internat . Journal & World Abstracting Service, vol. 55, No. 9, Jul. 9, 2015 (Jul. 9, 2015) pp. 2050-2054.

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Kenny Gross, Oracle Labs; MSET2 Overview: "Anomaly Detection and Prediction" Oracle Cloud Autonomous Prognostics; p. 1-58; Aug. 8, 2019.

Whisnant et al; "Proactive Fault Monitoring in Enterprise Servers", 2005 IEEE International Multiconference in Computer Science & Computer Engineering, Las Vegas, NV, Jun. 27-30, 2005.

U.S. Nuclear Regulatory Commission: "Technical Review of On-Lin Monitoring Techniques for Performance Assessment vol. 1: State-of-the-Art", XP055744715, Jan. 31, 2006, pp. 1-132.

Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.

Gross, K. C. et al., "Application of a Model-Based Fault Detection System to Nuclear Plant Signals," downloaded from https://www.researchgate.net/publication/236463759; Conference Paper: May 1, 1997, 5 pages.

Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.

\* cited by examiner

AUTONOMOUS CLOUD-NODE SCOPING FRAMEWORK FOR BIG-DATA MACHINE LEARNING USE CASES

CROSS REFERENCE TO RELATED APPLICATIONS

This disclosure claims the benefit of U.S. Provisional Patent Application Ser. No. "62/943,411" filed Dec. 4, 2019, titled "Autonomous Cloud-Node Scoping Framework for Big-Data Machine Learning Use Cases," inventors: Edward Wetherbee, Kenny C. Gross, Guang Chao Wang, and Matthew Gerdes, and assigned to the present assignee, which is incorporated by reference herein in its entirety.

BACKGROUND

Cloud containers have seen increased use in the business world. A cloud container is a logical packaging that encapsulates an application and its dependencies, allowing the containerized application to be run on a variety of host environments, such as on Linux, Windows, Mac, operating systems, virtual machines, or bare metal servers. One example of such a container is a Docker® container. The cloud container technology enables business enterprises to readily deploy and access software as a service on the Internet. Containerization provides a separation of concerns, as the business enterprise can focus on its software application logic and dependencies without concern for deployment and configuration details, while the cloud vendor can focus on deployment and configuration without bothering with software application details. Implementing applications with cloud containers also, provides a high degree of customization and reduces the operations and infrastructure costs for the business enterprise (versus the relatively high cost of operating their own datacenters).

Implementing a software application with cloud container technology also enables the software to scale with the computing needs of the business enterprise. Cloud computing service vendors such as Oracle may charge for cloud container services based on the specific use cases, number of users, storage space and compute costs. Hence, a business enterprise that purchases the cloud container services will only pay for the services procured, and will choose a package that suits the business enterprise's budget. Major cloud vendors offer cloud container services, including Amazon, Google, Microsoft and Oracle.

However, implementations of machine learning software applications have not been readily scalable with cloud container technology due to highly complex interrelationships between available memory provisioned, the aggregate GPU and CPU power provisioned, total number of signals, and sampling rate of the sensor streams governing throughput and latencies.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
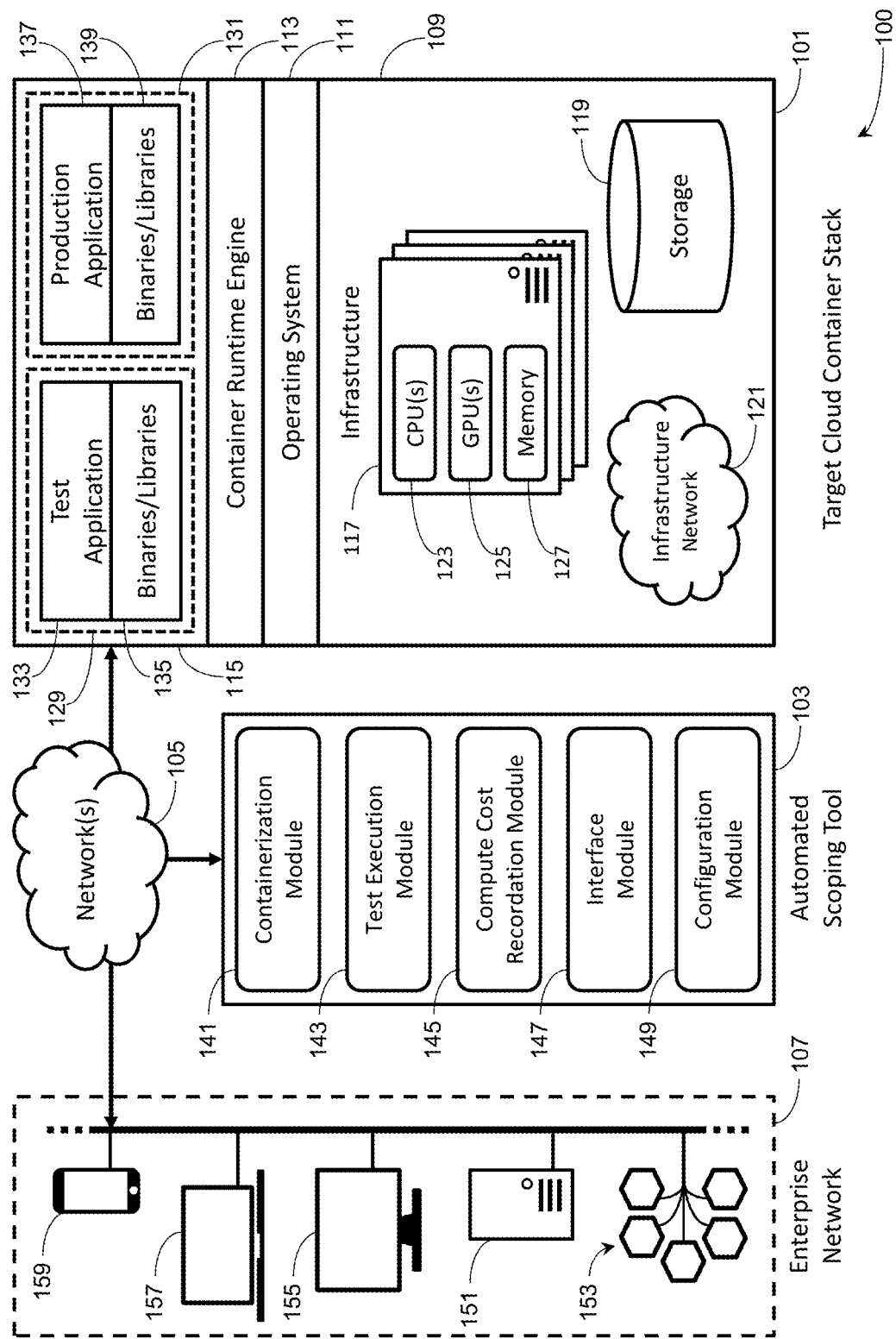
FIG. 1 illustrates one embodiment of a cloud computing system associated with autonomous cloud node scoping for big data machine learning use cases.

Systems and methods are described herein that provide an autonomous cloud-node scoping framework for big-data machine learning use cases.

Machine learning (ML) techniques may be applied to generate prognostic information for internet of things (IoT) applications. In some implementations the machine learning techniques are applied to datasets generated by dense-sensor IoT applications. Dense-sensor applications have a high volume of sensor-generated information that require low-latency and high-throughput data handling. Often, prognostic applications are run by on-premise ("on-prem") datacenter assets. The resources in the datacenter, such as central processing units (CPUs), graphics processing units (GPUs), memory, and input/output (I/O) handling will be reconfigured from time-to-time to grow along with use case requirements.

Cloud computing provides an alternative to on-premise computing. A business enterprise that implements its prognostic machine learning applications in a cloud container environment will save the huge overhead costs associated with running their own data center. Further, the business enterprise may also gain access to advanced prognostic machine learning pattern recognition native to the cloud environment to identify anomalies in streaming sensor signals. But, achieving the low-latency and high-throughput specifications for large-scale streaming prognostics applications with prognostic ML algorithms (such as Oracle's® MSET2) in a cloud computing environment requires that the cloud computing environment be correctly matched to the performance specifications before the prognostics applications are deployed in the cloud environment. The sizing of the computing environment involves identifying a container configuration of a correct number of CPUs and/or GPUs, a correct number of computing cores, a correct amount of storage, and/or a "shape" of the container in terms of GPUs to CPUs. Correctly sizing the cloud container for the business enterprise's application to ensure that the business enterprise has good performance for real-time streaming prognostics presents a number of technical challenges.

For business enterprises that already have big-data streaming analytics in their on-premise datacenters, it has not been possible to scale to approximate the needed CPUs, GPUs, memory, and/or storage footprint in an Oracle Cloud Infrastructure (OCI) cloud container, for multiple reasons.

Machine learning prognostics are often "compute bound," meaning that the time for it to complete a task is determined principally by the speed of the central processor. But, business enterprises implementing streaming analytics are not only concerned about GPU/CPU performance keeping up with real-time (a fundamental specification for streaming prognostics), but are equally concerned about throughput and latencies. For streaming machine learning prognostics, throughput and latencies are dependent in a very complex way on the amount of available memory provisioned, the aggregate GPU and CPU power provisioned, as well as the total number of signals and observations per second in the sensor streams. Generally, the compute cost scales quadratically with the number of signals and linearly with the number of observations. Further, the business enterprise's expectation on accuracy of the machine learning prognostics also influences the configuration requirements for the cloud container—the number of training vectors directly impacts memory requirements for the container in addition to adding to compute cost overhead for training of the machine learning model.

In the past, due to these complex relationships for machine learning prognostics, it would take many trial-and-error runs by the business enterprise, as well as the efforts of consultants, to discover optimal cloud configurations for typical use cases for the business enterprise. The trial-and-error nature of discovering optimal cloud configurations prevents a business enterprise from starting small and autonomously growing their cloud container capabilities through elasticity as compute dynamics dictate. In order to enable autonomous growth of cloud container capabilities in response to compute dynamics in real-life use of prognostic machine learning application, the performance of the machine learning technique as deployed in a cloud container must be assessed.

To resolve these and other technical challenges, this application offers an autonomous container scoping tool (or automated scoping tool) that uses a nested-loop Monte Carlo-based simulation to autonomously scale any size customer machine learning use cases across the range of cloud CPU-GPU "shapes" (configurations of CPUs and/or GPUs in cloud containers, such as OCI containers) available in a target cloud container stack. In one embodiment, the autonomous container scoping tool stress tests candidate cloud containers for a machine learning application as a parametric function of the total number of signals in an observation, the number of observations, and the number of training vectors in a nested-loop, multi-parameter approach. The autonomous container scoping tool generates expected cloud container performance in terms of throughput and latency as a function of the customer's expected number of signals and sampling rates for those signals, a capability that has never before existed.

The autonomous container scoping tool is a machine-learning-friendly framework that allows performance of automated scoping assessment for any pluggable machine learning algorithm. In one embodiment, the automated scoping tool employs a pluggable framework that can accommodate the various forms of machine learning techniques. Any containerized machine learning technique, such as applications including multivariate state estimation technique (MSET), Neural Nets, Support Vector Machines, Auto-Associative Kernel Regression, and customer specific machine learning applications, may be simply plugged into the tool for evaluation according to the defined range of use cases. The autonomous container scoping tool may thus assess the performance of the containerized machine learning application under any specified type of use case. In one embodiment, the automated scoping tool can estimate an appropriate size and shape of cloud containers for the machine learning technique.

Each of the MSET, Neural Nets, Support Vector Machines, and Auto-Associative Kernel Regression machine learning techniques is a type of advanced nonlinear nonparametric (NLNP) pattern recognition. The compute cost and memory footprints for such NLNP pattern recognition scale in a complex, nonlinear way with the number of sensors, the number of observations or samples per unit time (or sampling rate), the total number of samples used for training, and the subset of the training data that is selected as training vectors.

Advantageously, in one embodiment, the automated scoping tool performs the scoping analysis right on the platform of interest—the target cloud computing platform on which the machine learning application will be deployed. This can be important because the compute cost overhead, as well as the latencies and throughput metrics will differ between various on-premise computing platforms, such as the business enterprise's legacy computing systems or Oracle Exadata® Database Machines and container shapes available in cloud computing infrastructure, such as Oracle Cloud Infrastructure (OCI).

In one embodiment, the automated scoping tool can be made fully autonomous, requiring no data scientists from the business enterprise and/or consultants. This enables business entities to autonomously grow their cloud container capabilities through elasticity as their processing demands increase. Further, the automated scoping tool enables business entities to autonomously migrate machine learning applications from their on-premise data centers into cloud containers in a cloud computing environment.

In one embodiment, the automated scoping tool can be used to quickly scope the size of a cloud container for new use cases involving an advanced prognostic machine learning technique. The automated scoping tool can the indicate a range of appropriate cloud container configurations including CPUs, GPUs, and/or one or more "shapes" that include both CPUs and GPUs in various shared memory configurations. In one embodiment, the resulting configurations can be combined with a pricing schedule to then provide the business enterprise with a range of cost estimates for a solution.

Other than the automated scoping tool described herein, there is no tool, technique, or framework that can estimate the size of cloud containers (i.e. number of CPUs, number of GPUs, amount of memory, and/or describe a proper "shape" of the container) for big-data machine learning use cases.

Example Environment

FIG. 1 illustrates one embodiment of a cloud computing system 100 associated with autonomous cloud node scoping for big data machine learning use cases. The cloud computing system 100 includes a target cloud container stack 101 and an automated scoping tool 103 interconnected by one or more networks 105 (such as the Internet or a private network associated with the target cloud container stack 101). The cloud computing system 100 may be configured to offer one or more software applications as a service over the network 105 to client computers in an enterprise network 107 associated with a business enterprise.

In one embodiment, the target cloud container stack 101 may be an Oracle Cloud Infrastructure stack. In another embodiment, the target cloud container stack may be a GE Predix® stack, a Microsoft Azure® stack, an Amazon Web Services stack (for example including Amazon Elastic Container Service), or other scalable cloud computing stack capable of supporting container-based applications.

In one embodiment, the target cloud container stack 101 includes an infrastructure layer 109, an operating system layer 111, a container runtime engine 113, and a container layer 115. The infrastructure layer 109 includes one or more servers 117 and one or more storage devices 119 interconnected by an infrastructure network 121. Each of the servers 117 includes one or more central processing units (CPUs) 123 and/or graphics processing units (GPUs) 125, as well as a memory 127. The storage devices may include solid-state memory drives, hard drive discs, network attached storage (NAS) devices, or other storage devices.

In one embodiment, the operating system layer 111 is any one of Linux, Windows, Mac, Unix, or other operating systems. These operating systems may be full-featured operating systems, or minimal operating system configurations including only the features necessary to support the use of infrastructure layer 109 by container runtime engine 113. In one embodiment, operating system 111 is not included in the target cloud container stack 101, and container runtime engine 113 is configured to directly interface with the infrastructure layer 109 in a bare-metal-type configuration, such as is offered by the Oracle Cloud Infrastructure Bare Metal Cloud.

The container runtime engine 113 automates containerized application deployment, scaling, and management. In one embodiment, the container runtime engine 113 is Oracle Container Cloud Service®. In one embodiment, the container runtime engine 113 is a Kubernetes® engine. The container runtime engine 113 supports the operation of containers in the container layer 115. In one embodiment, the containers 129, 131 in the container layer are Docker® containers, that is, containers constructed in the Docker image format. In one environment, a container 129 for a test application 133 is deployed to the container layer 115. The binaries and libraries 135 supporting the test application 127 are included in the container 123. In one embodiment, a container 131 for a production application 137 is deployed to the container layer 115. The binaries and libraries 139 supporting the production application 137 are included in the container 125.

The containers (for example, test application container 129 or production application container 131) deployed to the container layer 115 may specify a "shape" (expressed in quantities of CPUs 123, GPUs 125, and Memory 127) of computing resources to be dedicated to the container. This "shape" information may be stored in the container image file. In one embodiment, the "shape" information is conveyed to the container runtime engine by setting runtime configuration flags of the "docker run" command (or equivalent command and flags in other container formats).

In one embodiment, the automated scoping tool 103 includes a containerization module 141, a test execution module 143, a compute cost recordation module 145, an interface module 147, and an evaluation module 149. In one embodiment, the automated scoping tool 103 is a special-purpose computing device configured with the modules 141-149. In one embodiment, the automated scoping tool is a part of target cloud container stack 101, for example a component of container runtime engine 113.

In one embodiment, the containerization module 141 automatically builds docker containers. The containerization module 141 accepts as inputs at least an application, binaries and libraries to support the application, and "shape" information for the container. From at least these inputs, the containerization module 141 creates a container image file (such as a Docker image) suitable for deployment to the container layer 115 of the target cloud container stack 101. In one embodiment, the containerization module 141 includes and/or interfaces with automated containerization tools available from Docker Inc. that scan applications and identifies application code and relevant binaries and/or libraries. The containerization module 141 then automatically generates a Docker image file based in part on these code, binaries, and/or libraries. In one embodiment, the container image file is created based at least in part on a template. The containerization module 141 may retrieve the template from a library of one or more templates.

In one embodiment, the test execution module 143 operates a sequence of benchmarking or stress test operations for a particular containerized application. For example, the test execution module 143 accepts as inputs at least (i) a range of a number of signals per observation and an increment over the range of number of signals, (ii) a range of a number of observations and an increment over the range of number of observations, (iii) a range of a number of training vectors and an increment over the range of number of training vectors, (iv) the particular containerized application, and (v) test data. The test execution module will cause the target cloud container stack 101 to execute the particular containerized application for each permutation of number of signals, number of observations, and number of training vectors as they are each incremented over their respective ranges. The number of training vectors may also be referred to as the size of the training data set.

In one embodiment, the particular containerized application is the test application 133. The containerization module 141 may cause the test application 133 and its associated binaries and/or libraries 135 to be scanned, for example, from an on-premise server 151 associated with the business enterprise, and transmitted from enterprise network 107 to automated scoping tool 103 over network 105. In one embodiment, the test application 133 is a dense-sensor IoT application for analyzing large-scale time series data bases using machine learning prognostics. The containerization module 141 creates the test application container 129 from the test application 133 and its associated binaries and/or libraries 135.

In response to an indication that the test application container will be used for testing, the containerization module will configure the test application container 129 to have a certain compute shape (of assigned CPUs 123, assigned GPUs 125, and allotted memory 127). In one embodiment, the compute shape is selected from a set or library of compute shapes appropriate for implementation by the target cloud container stack 101. The appropriate compute shapes may be based on features of the target cloud container stack 101, such as the hardware configuration and/or software configuration of the target cloud container stack 101. The appropriate set of shapes may vary between target cloud container stacks with differing hardware or software configurations. A library of compute shapes associated with each possible target cloud container stack may be maintained by the automated scoping tool 103, and a compute shape associated with the target cloud container stack 101 may be retrieved from the library by the containerization module 141 when containerizing the test application 133.

In one embodiment, there are multiple compute shapes appropriate for use with a target cloud container stack configuration. Each of the test application containers 129 may be a candidate for selection as the production application container 131. In one embodiment, in response to the indication that the test application container will be used for testing, the containerization module will configure the test application container 129 to have a first un-evaluated compute shape, and increment to the next un-evaluated compute shape on the next iteration of testing. In this way, a test application container 129 is created for each compute shape appropriate for the target cloud container stack 101, and each candidate container shape is evaluated in turn.

Container runtime engine 113 and automated scoping tool 103 may each be configured with an application programming interface (API) to accept and send information and commands. For example, the APIs may be a representational state transfer (REST) API. The containerization module 141 may send an API command to container runtime engine 113 directing the container runtime engine 113 to deploy the test application container 129 into the container layer 115. The containerization module may also transmit the test application container 129 to the container runtime engine 113 for deployment.

In one embodiment, the test execution module 143 accesses a body of test data for use by the test application 133 during execution by the target cloud container stack 101. The test data should include training vectors and observations. The training vectors are memory vectors for sensor observations that represent normal operation of a system monitored or surveilled by the sensors. The test data should include a sufficient quantity of training vectors to allow execution of each training permutation of the test. The observations are memory vectors for sensor observations that are unknown as to whether they represent normal operation of the system monitored by the sensors. The test data should include a sufficient quantity of observations to allow execution of each observation permutation of the test. In one embodiment, the numbers of signals in the observations and training vectors is matched to the number of signals currently being tested. In one embodiment, the numbers of signals in the observations and training vectors is the largest number of signals, and unused signals are disregarded by the test.

In one embodiment, the body of test data is historical data compiled by, for example, the on-premise server 151 from readings from one or more Internet of Things (IoT) (or other) sensors 153. The number of sensors 153 may be very high. In some implementations the machine learning techniques are applied to datasets generated by dense-sensor IoT applications. Dense-sensor applications have a high volume of sensor-generated information that require low-latency and high-throughput data handling. The test execution module 143 accepts or retrieves the body of test data from the on-premise server 151 over network 105. The test execution module 143 causes the body of test data to be provided to the test application 133 during execution by the target cloud container stack 101.

In one embodiment, the body of test data is synthesized data generated based on historical data compiled by, for example, the on-premise server 151. Automated scoping tool 103 may include a signal synthesis module (not shown).

In one embodiment, the compute cost recordation module 145 tracks the compute cost of each permutation of number of signals, number of observations, and number of training vectors in the test. In one embodiment, the compute cost is measured in elapsed milliseconds between initiating and completing the calculations. In one embodiment, the compute cost is measured by the time it takes the target cloud container stack 101 to execute the test application 133 for the permutation. In one embodiment, the test application container 129 is configured to transmit, over the network 105 to the compute cost recordation module 145, the respective times execution of the test application 133 commences and completes on the target cloud container stack 101. In one embodiment, for each permutation, the compute cost recordation module 145 is configured to record the performance in a data store associated with the automated scoping tool 103. The performance may be recorded as a data structure representing a tuple indicating (i) a number of signals per observation for the permutation, (ii) a number of observations for the permutation, (iii) a number of training vectors for the permutation, and (iv) the difference between the times execution of the test application 133 commenced and completed for the permutation. Other compute cost metrics may also be appropriate, such as counts of processor cycles or counts of memory swaps required to complete execution of the test application 133 for the permutation, and may similarly be tracked and reported to the compute cost recordation module, and recorded in the data store.

In one embodiment, the compute cost is broken down into compute cost for the training cycle and compute cost for the surveillance cycle. The test application container 129 is configured to transmit, to the compute cost recordation module 145, (i) the respective times execution of a training cycle for the test application 133 commences and completes on the target cloud container stack 101, and (ii) the respective times execution of a surveillance cycle for the test application 133 commences and completes on the target cloud container stack 101. This performance may be recorded in a data store associated with the automated scoping tool 103. The record may be a data structure representing a tuple indicating (i) a number of signals per observation for the permutation, (ii) a number of observations for the permutation, (iii) a number of training vectors for the permutation, (iv) the difference between the times execution of the training cycle for the test application 133 commenced and completed for the permutation, and (v) the difference between the times execution of the surveillance cycle for the test application 133 commenced and completed for the permutation.

In one embodiment, the interface module 147 is configured to generate and transmit instructions that cause a user interface to the automated scoping tool 103 to be displayed on a client computing device. For example, the user interface may include graphical user interfaces (GUIs) that incorporate GUI elements for gathering information and commands from users or administrators of the automated scoping tool 103 and/or cloud computing system 100. These GUI elements include a variety of graphical buttons, radio buttons, check boxes, text boxes, menus such as drop-down menus, and other elements.

The interface module 147 may be configured to display visualizations of the performance data recorded in the data store associated with the automated scoping tool 103. In one embodiment, the visualization is a graph showing the relationship between compute cost and one or more of the number of signals, number of observations, and number of training vectors over a set of permutations of the test. In one embodiment, the visualizations may be specific to training cycles of the test or surveillance cycles of the test.

In one embodiment, the evaluation module 149 determines a recommended container "shape" (also referred to as a "compute shape") for operating a production application 137 version of the application scanned from the on-premise server 151. The evaluation module 149 accepts as inputs (i) a minimum latency threshold for the rate of processing observations, or target latency, (ii) a target number of signals that will be included in each observation, (iii) a target number of observations per unit time or target sampling rate, and (iv) a target number of training vectors. These may be referred to as the performance constraints for the machine learning application, and represent real-world expected operating conditions. The evaluation module 149 also accepts as inputs (v) the performance data recorded by the compute cost recordation module. Based at least in part on these inputs, the evaluation module 149 can create a recommended container shape (described in quantity of CPUs 123, quantity of GPUs 125, and allocated memory) for deployment on the target cloud container stack. This recommended shape may be presented by the interface module in a GUI for review and confirmation by a user of the automated scoping tool 103. The GUI may further display one or more visualizations of the performance data in support of the recommended shape. In one embodiment, the evaluation module 149 generates an instruction to form the production application container 131 with the recommended shape and transmits it to the containerization module 141 to generate the production application container 131. In one embodiment, the GUI includes a GUI element configured to accept an input approving the creation of the production application container using the recommended shape.

In one embodiment, the evaluation module 149 further accepts as inputs a price per unit time for use of each of CPUs and GPUs. The recommended "shape" may further be based upon the prices per unit time for CPUs and GPUs. For example, the recommended shape may be the one that minimizes overall cost for maintaining the minimum rate of throughput of observations.

In one embodiment, the evaluation module 149 ranks a set of possible container shapes according to a criterion, such as monetary costs to operate the container shape. In one embodiment, the evaluation module will exclude from the set of possible container shapes those container shapes that do not satisfy the performance constraints, to create a list of feasible container shapes, which may be further ranked In addition to on-premise server 151 and IoT sensors 153, enterprise network 107 may also include a wide variety of computing devices and/or networked devices. Examples of such computing devices include server computers like on-premise server 151, personal computers such as desktop computer 155, laptop or notebook computer 157, tablet computers or personal digital assistants (PDAs), cell phones, smart phones 159, or other mobile devices, machine control devices, IP telephony devices, and other electronic devices incorporating one or more computing device components, such as one or more electronic processors, microprocessors, central processing units (CPU), or controllers. During execution of production application 137 by the target cloud container stack 101, one or more of the devices of enterprise network 107 may provide information to production application 137 or request and receive information from production application 137. For example, IoT sensors 153 may provide the observations surveilled or monitored by production application 137. Or, for example, a client application executing on desktop computer 155, laptop computer 157, and/or smart phone 159 may request information about the systems surveilled or monitored by production application 137.

Example Methods

Computer-implemented methods for autonomous cloud-node scoping for big-data machine learning use cases are described in this specification. In one embodiment, one or more computing devices (such as computer 1105, shown and described with reference to FIG. 11) with operably connected processor (such as processor 1110) and memory (such as memory 1115) and other components may be configured with logic (such as autonomous cloud-node scoping logic 1130) that causes the computing device to perform steps of the method. For example, the processor accesses and reads from or writes to the memory to perform the steps shown and described with reference to FIG. 2. These steps may include (i) retrieving any necessary information, (ii) calculating, determining, generating, classifying, or otherwise creating any data, and (iii) storing any data calculated, determined, generated, classified, or otherwise created. In one embodiment, the methods described herein may be performed by automated scoping tool 103 or target cloud container stack 101 (as shown and described with reference to FIG. 1).

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 2:
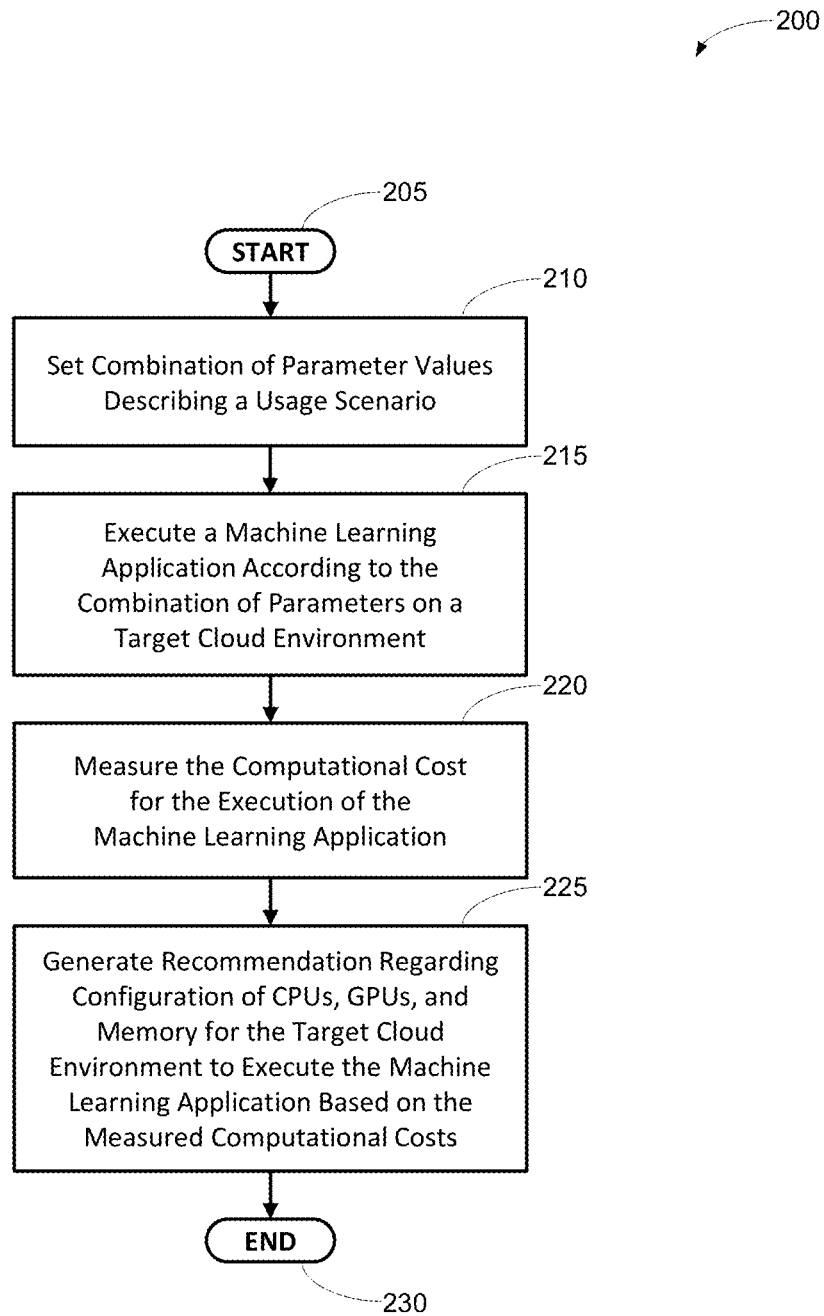
FIG. 2 illustrates one embodiment of a method associated with autonomous cloud-node scoping for big-data machine learning use cases.

FIG. 2 illustrates one embodiment of a method 200 associated with autonomous cloud-node scoping for big-data machine learning use cases. In one embodiment, a computer-implemented method is presented. The method comprises, for each of multiple combinations of parameter values, (i) a step of setting a combination of parameter values describing a usage scenario, (ii) a step of executing a machine learning application according to the combination of parameter values on a target cloud environment, and (iii) a step of measuring the computational cost for the execution of the machine learning application. The method also comprises a step of generating a recommended configuration of central processing unit(s), graphics processing unit(s), and memory for the target cloud environment to execute the machine learning application based on the measured computational costs. In one embodiment, the method 200 may be performed by automated scoping tool 103 and/or target cloud container stack 101.

The method 200 may be initiated based on various triggers, such as receiving a signal over a network or parsing stored data indicating that (i) a user (or administrator) of cloud computing system 100 has initiated method 200, (ii) that that method 200 is scheduled to be initiated at a defined time, or (iii) an automated process for migrating a machine learning application from a first computer system to a target cloud environment is being performed. The method 200 initiates at START block 205 in response to parsing a signal received or stored data retrieved and determining that the signal or stored data indicates that the method 200 should begin. Processing continues to process block 210.

At process block 210, the processor sets a combination of parameter values describing a usage scenario.

In one embodiment the processor retrieves the next combination of parameter values from memory or storage. The parameters may be the number of signals per observation, the number of observations, and the number of training vectors. The processor generates an instruction to the test application 133 (machine learning application containerized with a specific compute shape) that it should execute using the retrieved combination of parameter values. The processor transmits the instruction to the test application 133, for example as a REST command. The instruction may be transmitted to the test application by way of the container runtime engine 113. The steps of process block 210 may be performed, for example, by test execution module 143 of automated scoping tool 103.

Once the processor has thus completed setting a combination of parameter values describing a usage scenario, processing at process block 210 completes, and processing continues to process block 215.

At process block 215, the processor executes a machine learning application according to the combination of parameter values on a target cloud environment.

In one embodiment, the test application 133 includes the machine learning algorithm. The processor generates an instruction to the test application 133, for example a REST command, that the test application 133 should commence execution. This step of generating an instruction to commence execution may be performed, for example, by test execution module 143 of automated scoping tool 103. In response, the processor retrieves a set of test data defined by the combination of parameter values. The processor executes the test application 133, including the machine learning algorithm, on the set of test data. In one embodiment, the processor records in memory a first time at which the processor commences executing the test application 133, and records in memory a second time at which the processor completes executing the test application. In one embodiment, the processor records in memory a first time at which the processor commences executing a training cycle of the test application 133, and records in memory a second time at which the processor completes executing the training cycle of the test application. In one embodiment, the processor records in memory a first time at which the processor commences executing a surveillance cycle of the test application 133, and records in memory a second time at which the processor completes executing the surveillance cycle of the test application 133. In one embodiment, the processor tallies in memory processor (CPU and/or GPU) cycles used during execution of the test application 133, a training cycle of the test application 133, and/or a surveillance cycle of the test application 133. These steps of retrieving the set of test data, executing the test application, and recording times or processor cycles may be performed, for example, by target cloud container stack 101.

Once the processor has thus completed executing a machine learning application according to the combination of parameter values on a target cloud environment, processing at process block 215 completes, and processing continues to process block 220.

At process block 220, the processor measures the computational cost for the execution of the machine learning application In one embodiment the processor generates a request to the test application container 129 to return the records of the first and second times and/or the tally of processor cycles. This request may be, for example, a REST request directed to the test application container 129 through container runtime engine 113. This request may also be, for example, generated and transmitted by the compute cost recordation module 145. The processor executing the application container (one or more processors of the target cloud container stack 101) then returns the requested times and/or tally to the compute cost recordation module 145. The processor executing the compute cost recordation module 145 then composes a compute cost record (a data structure) that includes the present combination of parameter values and the compute cost and stores it in memory or storage. The combination of parameter values may include the number of signals, number of observations, and number of training vectors. The compute cost may include the difference(s) between the returned first and second times, and/or the returned tally of processor cycles.

Once the processor has thus completed measuring the computational cost for the execution of the machine learning application, processing repeats from process block 210 for each of the remaining multiple combinations of parameter values until no further combinations of parameter values remain. The processor increments one of the parameter values to move to the next combination of parameter values in a nested-loop traversal of the parameter value combinations possible for the stored increment values. The increment value for the parameter may be retrieved from memory or storage. In this way, a combination of parameter values is set to describe each expected use case, the machine learning application is executed for the parameter values for each expected use case, and the performance of the machine learning application is measured for each expected use case. Processing at process block 220 then completes, and processing continues to process block 225.

At process block 225, the processor generates a recommendation regarding configuration of central processing unit(s), graphics processing unit(s), and memory for the target cloud environment to execute the machine learning application based on the measured computational costs.

In one embodiment, the processor retrieves the compute cost records for a target combination of number of signals, observations, and training vectors. The processor determines whether the compute cost at the target combination exceeds a target latency for performance of the machine learning application at the target combination. The target latency and target combination are user provided information. If the target latency is exceeded, the compute shape (configuration of central processing unit(s), graphics processing unit(s), and memory for the target cloud environment) assigned to the machine learning application in test application 133 is inadequate, and will cause a backup of unprocessed observations. Thus, if the target latency is exceeded, the processor will generate a recommendation against the compute shape of the test application 133. If the target latency is not exceeded, the compute shape assigned to the machine learning application in test application 133 is adequate, and will timely process the observations provided to the test application 133. Thus, if the target latency is not exceeded, the processor will generate a recommendation in favor of the compute shape. The processor may further select the compute shape (configuration of central processing unit(s), graphics processing unit(s), and memory for the target cloud environment) of the test application as the compute shape for configuration of a container for deploying the machine learning application to the target cloud container stack (creating a production application 137).

In one embodiment, where compute costs of multiple test applications do not exceed the target latency, the processor may further evaluate which of the multiple test applications have the least monetarily expensive compute shape (as discussed further herein).

Once the processor has thus completed generating a recommendation regarding configuration of central processing unit(s), graphics processing unit(s), and memory for the target cloud environment to execute the machine learning application based on the measured computational costs, processing at process block 225 completes, and processing continues to END block 230, where process 200 ends.

Figure 3:
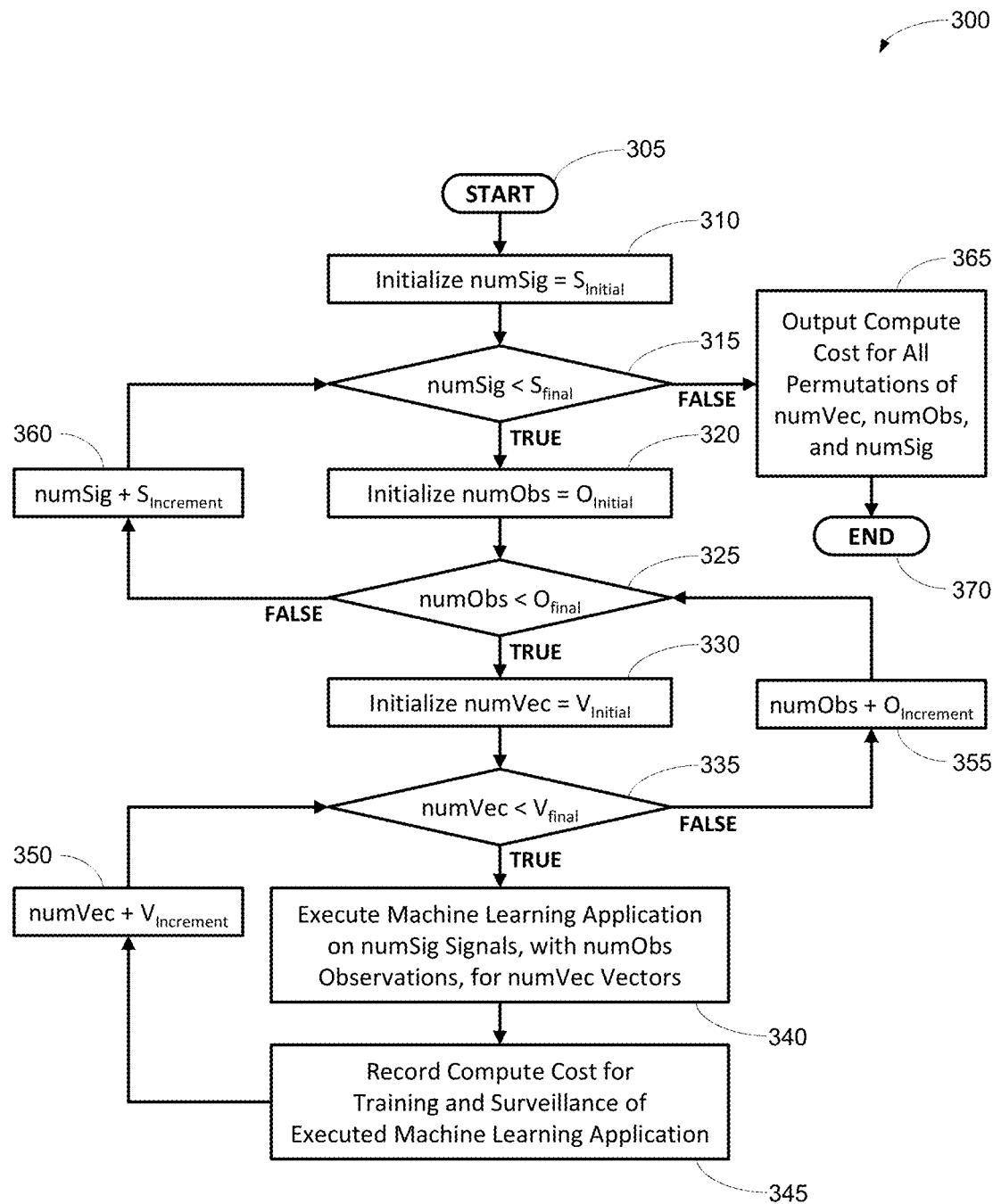
FIG. 3 illustrates one embodiment of a method associated with autonomous cloud-node scoping for big-data machine learning use cases and showing detail of one embodiment of nested-loop traversal of parameter value combinations.

In one embodiment, the combination of parameter values is set according to a Monte Carlo simulation, and the parameter values to the machine learning application as inputs to the machine learning application during the execution of the machine learning application. Accordingly, FIG. 3 illustrates one embodiment of a method 300 associated with autonomous cloud-node scoping for big-data machine learning use cases and showing detail of one embodiment of nested-loop traversal of parameter value combinations. The method 300 may be initiated based on various triggers, such as receiving a signal over a network or parsing stored data indicating that (i) a user (or administrator) of cloud computing system 100 has initiated method 300, (ii) method 300 is scheduled to be initiated at a defined time, (iii) an automated process for migrating a machine learning application from a first computer system to a target cloud environment is being performed; or (iv) the method 300 is being performed for a specific compute shape as part of an evaluation of multiple compute shapes. The method 300 initiates at START block 305 in response to parsing a signal received or stored data retrieved and determining that the signal or stored data indicates that the method 300 should begin. Processing continues to process block 310.

At process block 310, the processor initializes a number of signals (numSig) by setting the number of signals to be equal to an initial number of signals ($S_{initial}$). In one embodiment, the processor retrieves a starting value for a range of the number of signals, such as an initial value of the range accepted by the test execution module 143 as input, as the initial number of signals. The processor sets the number of signals to be equal to the retrieved value. Processing at process block 310 completes and processing continues at decision block 315.

At decision block 315, the processor determines whether the number of signals (numSig) is less than a final number of signals ($S_{final}$). The processor retrieves an ending value for the range of the number of signals, such as the final value of the range accepted by the test execution module 143 as input, as the final number of signals. The processor compares the number of signals to the final number of signals. If it is true that the number of signals is less than the final number of signals, processing at decision block 315 completes and processing continues at process block 320.

At process block 320, the processor initializes a number of observations (numObs) by setting the number of observations to be equal to an initial number of observations ($O_{initial}$). In one embodiment, the processor retrieves a starting value for a range of the number of observations, such as an initial value of the range accepted by the test execution module 143 as input, as the initial number of observations. The processor sets the number observations to be equal to the retrieved value. Processing at process block 320 completes and processing continues at decision block 325.

At decision block 325, the processor determines whether the number of observations (numObs) is less than a final number of observations ($O_{final}$). In one embodiment, the processor retrieves an ending value for the range of the number of observations, such as the final value of the range accepted by the test execution module 143 as input, as the final number of observations. The processor compares the number of observations to the final number of observations. If it is true that the number of observations is less than the final number of observations, processing at decision block 325 completes and processing continues at process block 330.

At process block 330, the processor initializes a number of training vectors (numVec) by setting the number of training vectors to be equal to an initial number of training vectors ($V_{initial}$). In one embodiment, the processor retrieves a starting value for a range of the number of training vectors, such as an initial value of the range accepted by the test execution module 143 as input, as the initial number of training vectors. The processor sets the number training vectors to be equal to the retrieved value. Processing at process block 330 completes and processing continues at decision block 335.

At decision block 335, the processor determines whether the number of training vectors (numVec) is less than a final number of training vectors ($V_{final}$). In one embodiment, the processor retrieves an ending value for the range of the number of training vectors, such as the final value of the range accepted by the test execution module 143 as input, as the final number of training vectors. The processor compares the number of training vectors to the final number of training vectors. If it is true that the number of training vectors is less than the final number of training vectors, processing at decision block 335 completes and processing continues at process block 340.

At process block 340, the processor executes a machine learning application that is plugged-in to a container and deployed to a target cloud container stack for the number of signals (numSig), the number of observations (numObs)), and the number of training vectors (numVec). In one embodiment, the processor generates instructions to the machine learning application telling it to draw the number of observations and the number of training vectors from the body of test data. Each of the observations and training vectors is limited to a length of the number of signals. The processor truncates the additional signal columns from the observations and training vectors drawn. The processor records a first time at which training of the machine learning application begins. The processor trains the machine learning application using the training vectors drawn. The processor records a second time at which training of the machine learning application ends. The processor records a third time at which monitoring (or surveillance) by the machine learning application begins. The processor monitors (or surveils) the observations drawn. The processor records a fourth time at which monitoring (or surveillance) of the machine learning application ends. Processing at process block 340 completes and processing continues at process block 345.

At process block 345, the processor records a compute cost for training and monitoring (or surveillance) by the executed machine learning application. In one embodiment, the processor (for example, in execution of the compute cost recordation module 145 of the automated scoping tool 103) generates and sends a request to the container deployed to the target cloud container stack. The request is for the container to return the first, second, third, and fourth times. The container retrieves the first, second, third, and fourth times from memory and generates a message including the times. The container sends the message to the compute cost recordation module 145. In response, the compute cost recordation module 145 writes the first, second, third, and fourth times, or differences between the second and first times, and the fourth and third times, along with the number of signals, the number of observations, and the number of training vectors in a compute cost data structure in a data store. Processing at process block 345 completes and processing continues at process block 350.

At process block 350, the processor increments the number of training vectors by a vector increment ($V_{increment}$). In one embodiment, the processor retrieves a vector increment value, such as the increment over the range of number of training vectors accepted by the test execution module 143, as the vector increment value. The processor assigns or sets the number of vectors to a new value—the sum of the present value of the number of vectors and the vector increment value. Once the processor has thus incremented the number of vectors by the vector increment, processing at process block 350 completes, and processing returns to decision block 335.

Processing between decision block 335 and 350 repeats for each increment of the number of vectors while it remains true that the number of training vectors is less than the final number of training vectors. This forms the innermost loop of a set of nested loops. Once it becomes false that the number of training vectors is less than the final number of training vectors (that is, the number of training vectors is greater than or equal to the final number of training vectors) the loop terminates, and processing continues at process block 355.

At process block 355, the processor increments the number of observations by an observation increment ($O_{increment}$). In one embodiment, the processor retrieves an observation increment value, such as the increment over the range of number of observations accepted by the test execution module 143, as the observation increment value. The processor assigns or sets the number of observations to a new value—the sum of the present value of the number of observations and the observation increment value. Once the processor has thus incremented the number of observations by the observation increment, processing at process block 355 completes, and processing returns to decision block 325.

Processing between decision block 325 and 355 repeats for each increment of the number of observations while it remains true that the number of observations is less than the final number of observations. This forms the middle loop of the set of nested loops. Once it becomes false that the number of observations is less than the final number of observations (that is, the number of observations is greater than or equal to the final number of observations) the loop terminates, and processing continues at process block 360.

At process block 360, the processor increments the number of signals by a signal increment ($S_{increment}$). In one embodiment, the processor retrieves a signal increment value, such as the increment over the range of number of signals accepted by the test execution module 143, as the signal increment value. The processor assigns or sets the number of signals to a new value—the sum of the present value of the number of signals and the signal increment value. Once the processor has thus incremented the number of signals by the signal increment, processing at process block 360 completes, and processing returns to decision block 315.

Processing between decision block 315 and 360 repeats for each increment of the number of signals while it remains true that the number of signals is less than the final number of signals. This forms the outer loop of the set of nested loops. Once it becomes false that the number of signals is less than the final number of signals (that is, the number of signals is greater than or equal to the final number of signals) the loop terminates, and processing continues at process block 365.

At process block 365, the processor outputs the compute costs for all permutations of the number of signals, the number of observations, and the number of training vectors. In one embodiment, the processor (for example, executing the interface module 147) retrieves each compute cost data structure from the data store. The processor generates instructions to display one or more graphs presenting bar plots and/or surface plots defined by one or more compute cost data structures. The processor then transmits the instructions to cause the one or more graphs to be displayed. Processing at process block 365 then completes, and processing continues to end block 370, where process 300 terminates.

—Simulating Signals—

In one embodiment, the method 300 may further include steps for (i) simulating a set of signals from one or more sensors; and (ii) providing the set of signals to the machine learning application as an input to the machine learning application during the execution of the machine learning application. For example, the processor executes the functions of a signal synthesis module (discussed with reference to FIG. 1 above). The signal synthesis module analyzes historical data compiled by the on-premise server 151 and generates the body of test data that is statistically identical to the historical data, thereby simulating signals. The signal synthesis module stores the body of test data in a data store associated with the automated scoping tool 103. The test execution module 143 accesses the synthesized body of test data for use by the test application 133 during execution by the target cloud container stack 101.

In one embodiment, the signal synthesis module analyzes the historical data and generates mathematical formulae which can be used to generate test data statistically identical to the historical data. The signal synthesis module stores the mathematical formulae in a data store associated with the automated scoping tool 103. The signal synthesis module generates synthesized test data on an as-required basis for use by the test application 133 during execution by the target cloud container stack 101. The use of mathematical formulae to synthesize data on an as-required basis has an advantage over use of a body of historical or synthesized test data in terms of required storage and portability—the body of test data can be several terabytes of data, while the mathematical formulae may be only a few kilobytes.

The synthesized test data have the same deterministic and stochastic structure, serial correlation for univariate time series, cross-correlation for multivariate time series, and stochastic content for noise components (variance, skewness, kurtosis) as the "real" historical data. In one embodiment, synthesis of data for the training vectors and for the observations are performed separately. Synthesis of training vectors for the body of test data is based on historical sensor observations that represent normal operation of a system monitored or surveilled by the sensors. Synthesis of observations for the body of test data is based on historical sensor observations that that are unknown as to whether they represent normal operation of the system monitored by the sensors.

—Parameter Variables—

In one embodiment, in the method 300, the combinations of parameter values are combinations of: (i) a value for a number of signals from one or more sensors; (ii) a value for a number of observations streaming per unit time; and (iii) a value for a number of training vectors to be provided to the machine learning application.

In the figures, the variable "numSig" refers to a number of signals (or discrete sensor outputs received) for an observation or training vector. The variable "numObs" refers to a number of observation vectors (memory vectors of length numSig) to be received over a given unit of time from the sensors of a system being surveilled (numObs may also be referred to as the sampling rate). In one embodiment, the observations are drawn from simulated data during scoping operations, and drawn from live data in the final deployment. The variable "numVec" refers to number of training vectors (memory vectors of length numSig) provided to a machine learning application to train the machine learning application (numVec may also be referred to as the size of the training set). In one embodiment, the training vectors are selected to characterize normal operation of the system being surveilled by the sensors.

—Non-Linear Relationship with Computational Costs—

In one embodiment, in the method 300, the machine learning application causes a non-linear relationship between the combinations of parameter values and the computational costs. As discussed above, the computational costs of streaming machine learning prognostics do not scale in a linear relationship with the number of signals and number of observations per unit time. Generally, the compute cost scales quadratically with the number of signals and linearly with the number of observations. The computational costs are also further affected by the amount of available memory provisioned, the aggregate GPU and CPU power provisioned. Accordingly, a containerized machine learning application will have a non-linear relationship between the combinations of parameter values and computational costs.

Customer use cases often vary greatly, from, for example, a simple business enterprise use case for monitoring one machine with 10 sensors and a slow sampling rate, to, for example, a multinational business enterprise use case with hundreds of thousands of high sampling rate sensors. An example below illustrates a range of typical customer use case scenarios of machine learning prognostics for cloud implementations:

Customer A has a use case with only 20 signals, sampled at a slow rate of just once per hour, such that a typical year's worth of data is a couple MB.

Customer B has a fleet of Airbus 320's, each with 75000 sensors onboard, sampled at once per second, such that every plane generates 20 TB of data per month.

Other business enterprise customers commonly fall somewhere in the very wide use case spectrum between A and B.

In one embodiment, the automated scoping tool 103 (in one embodiment, using the containerization module 141) accepts as the pluggable machine learning application a nonlinear nonparametric (NLNP) pattern recognition application. In one embodiment, the NLNP pattern recognition application is at least one of a MSET application, Multivariate State Estimation Technique 2 (MSET2) application, Neural Net application, Support Vector Machine application, and Auto-Associative Kernel Regression application.

Figure 4:
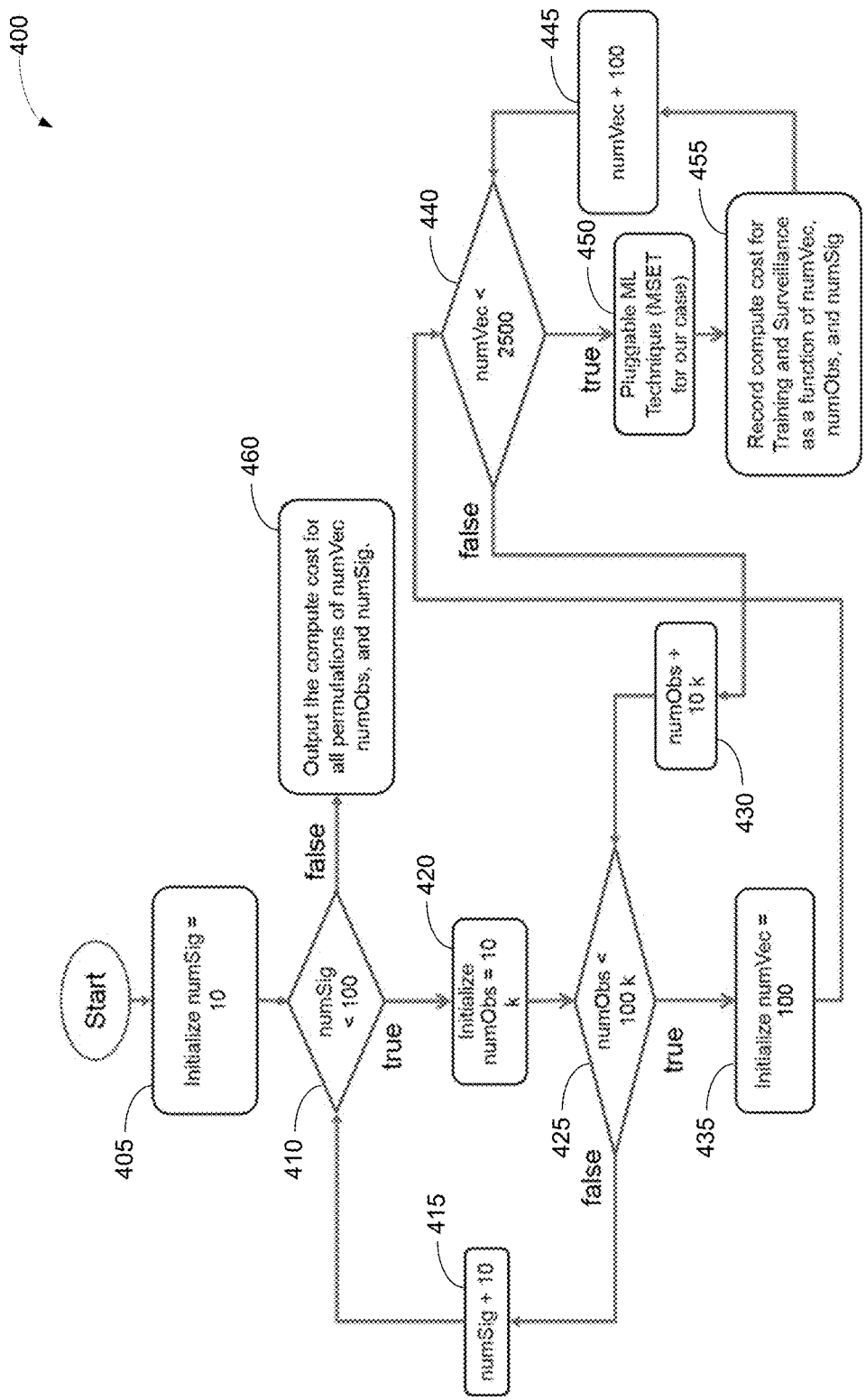
FIG. 4 shows one example of a method for a particular use case associated with autonomous cloud-node scoping for big-data machine learning.
Figure 5A:
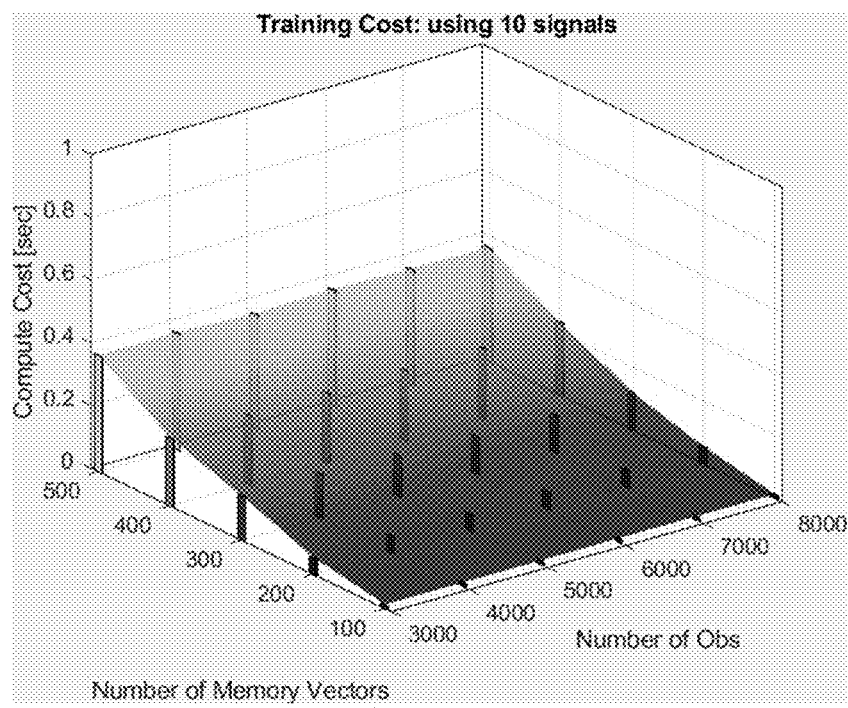
FIGS. 5A—D show example three-dimensional (3D) graphs generated to show the compute cost for a training process for a prognostic machine learning technique called multivariate state estimation technique (MSET) as a function of the number of observations and the number of training vectors.
Figure 5B:
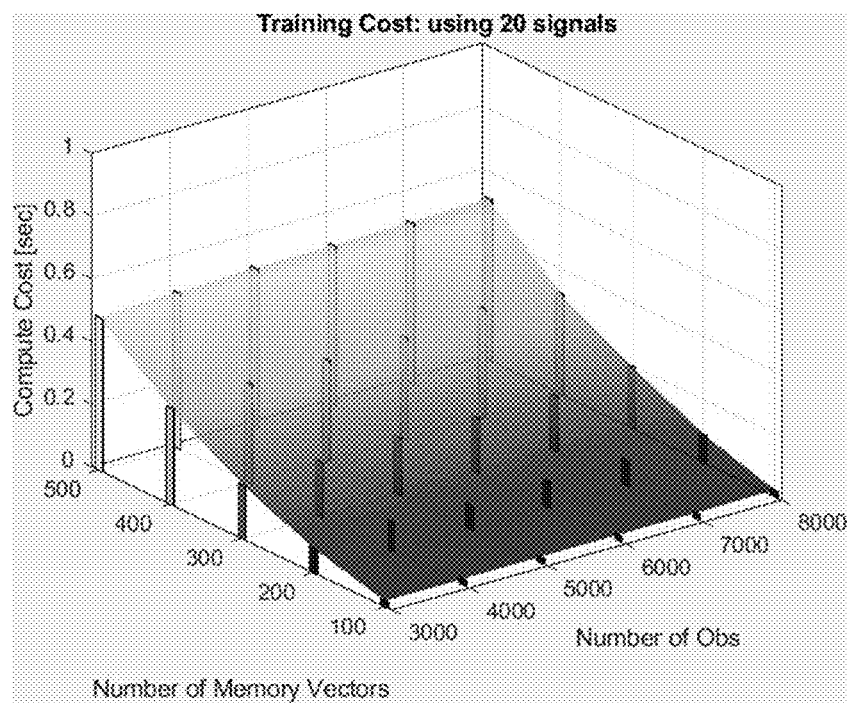
Figure 5C:
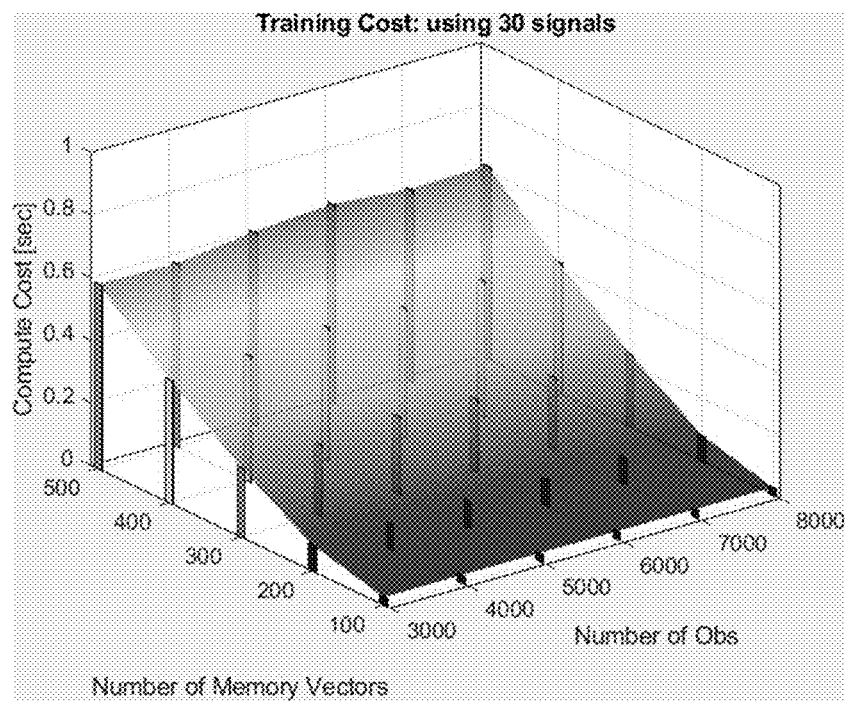
Figure 5D:
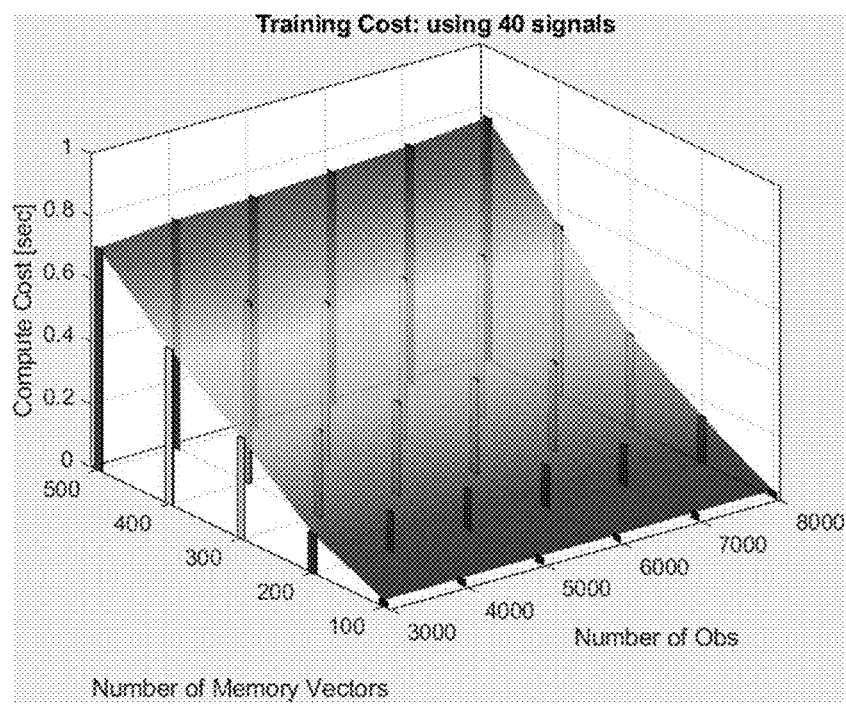
Figure 6A:
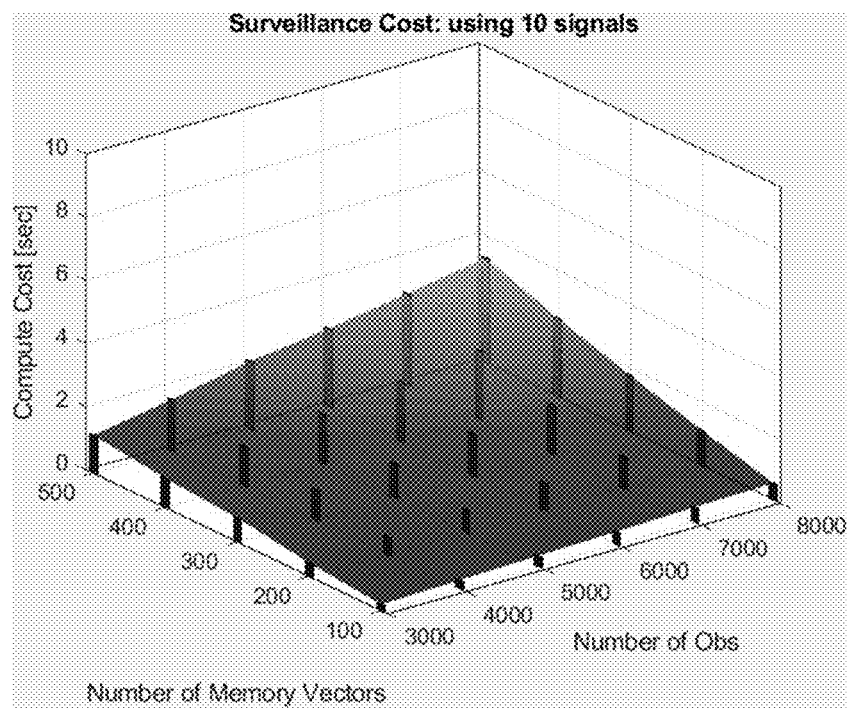
FIGS. 6A—D show example three-dimensional (3D) graphs generated to show the compute cost for streaming surveillance using MSET as a function of the number of observations and the number of training vectors.
Figure 6B:
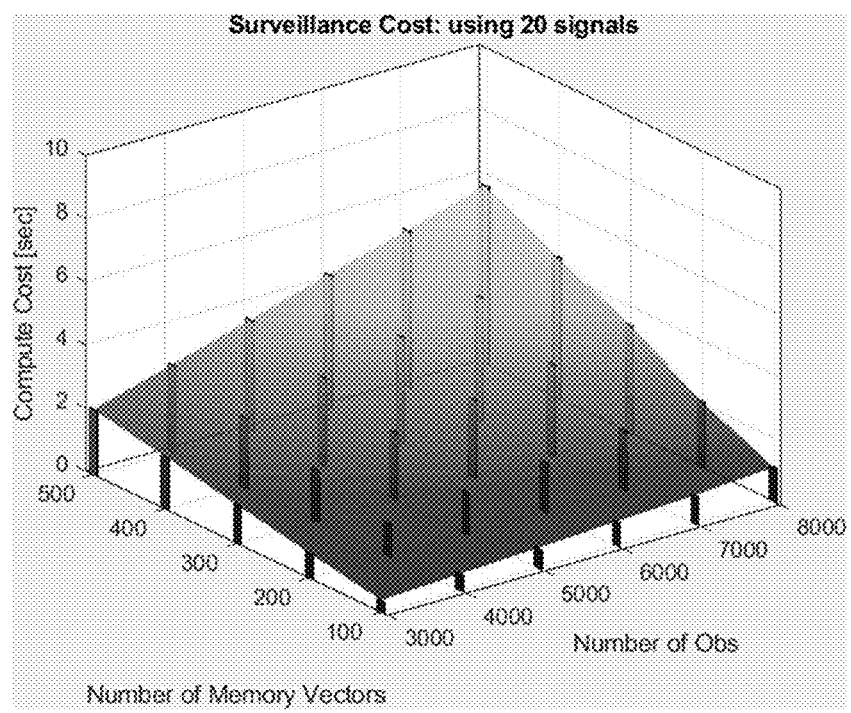
Figure 6C:
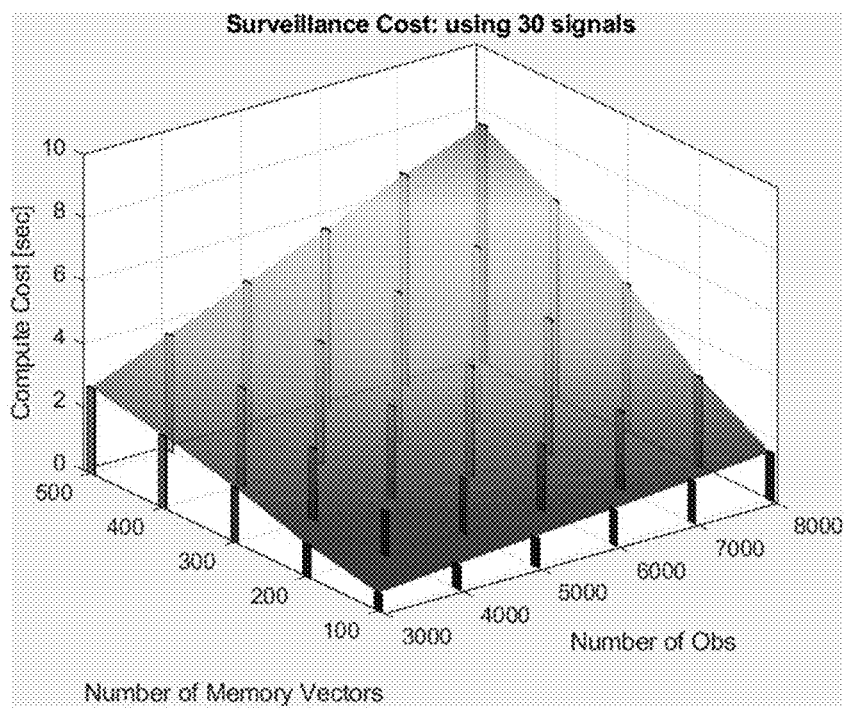
Figure 6D:
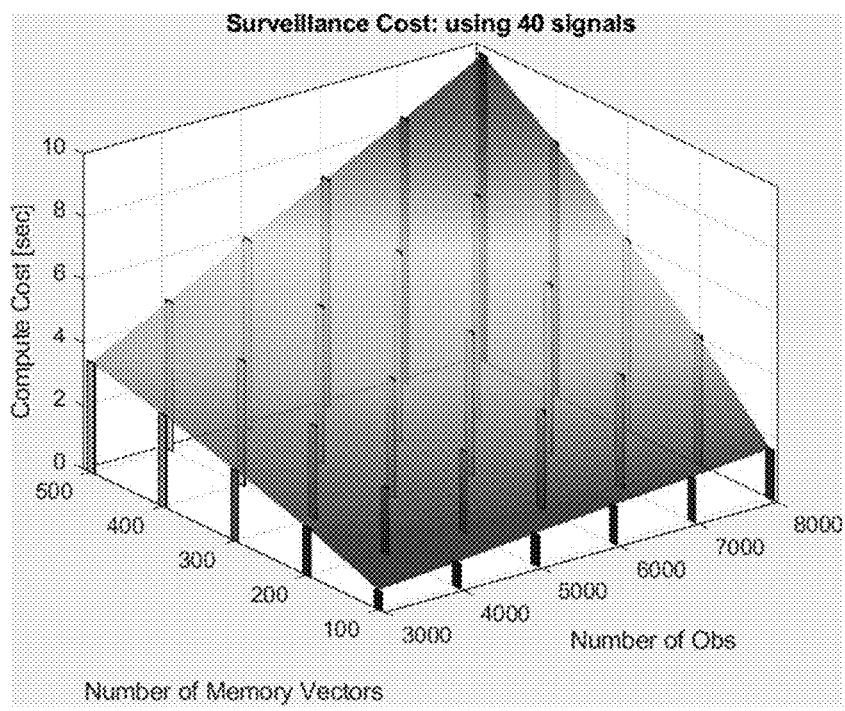
Figure 7A:
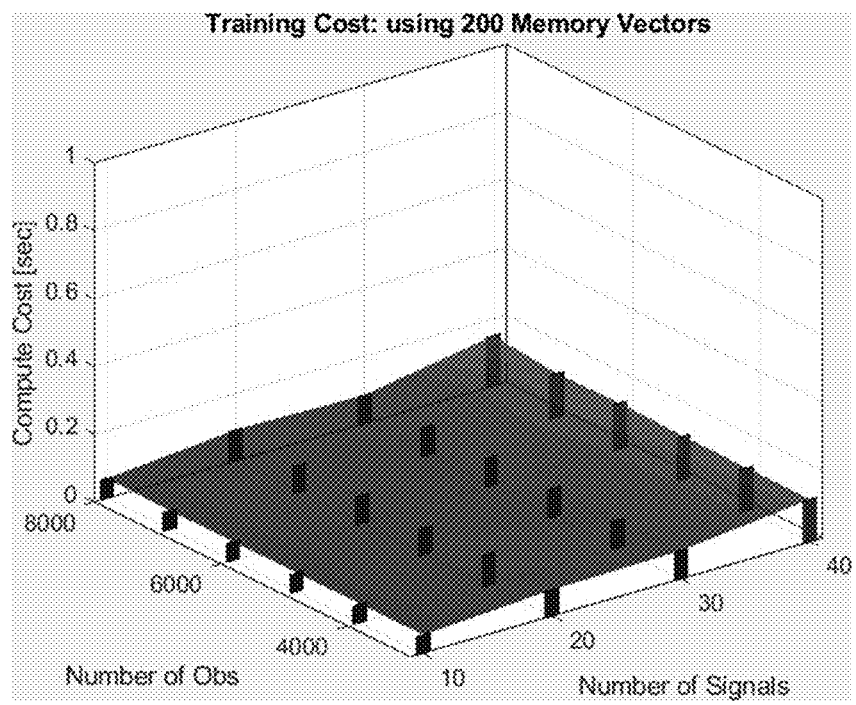
FIGS. 7A—D show example three-dimensional (3D) graphs generated to show the compute cost for a training process for MSET as a function of the number of observations and the number of signals.
Figure 7B:
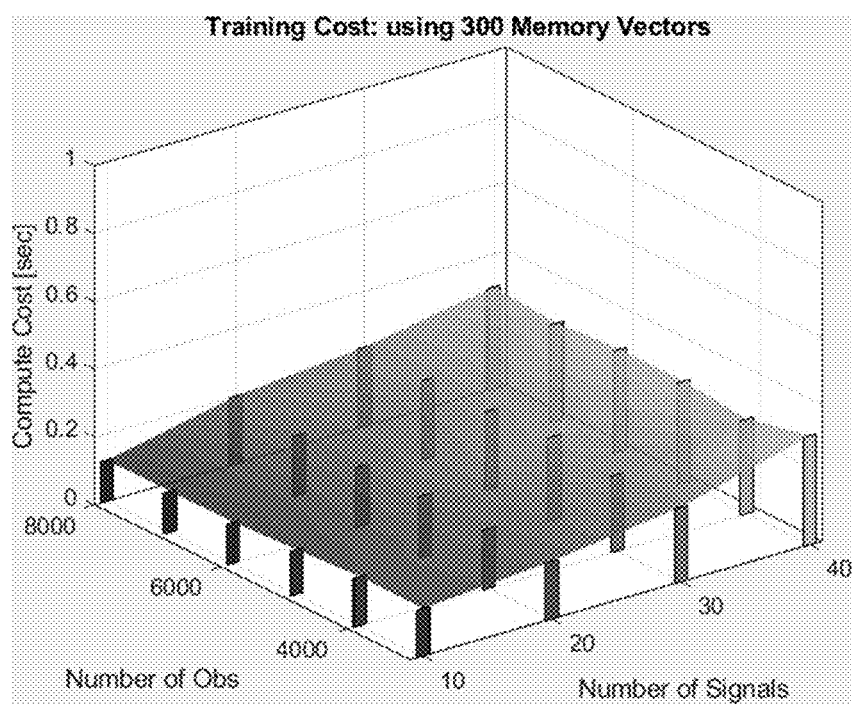
Figure 7C:
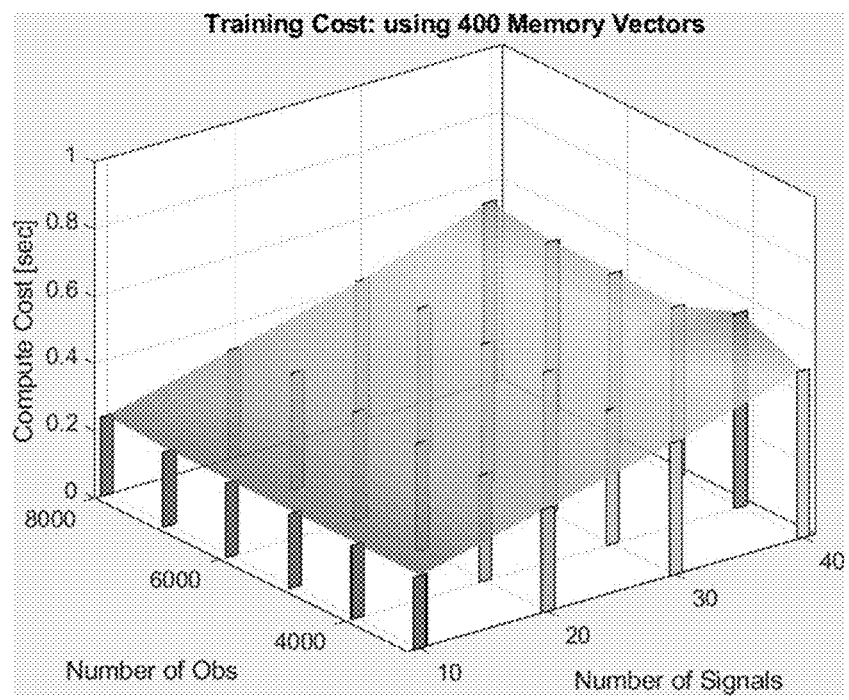
Figure 7D:
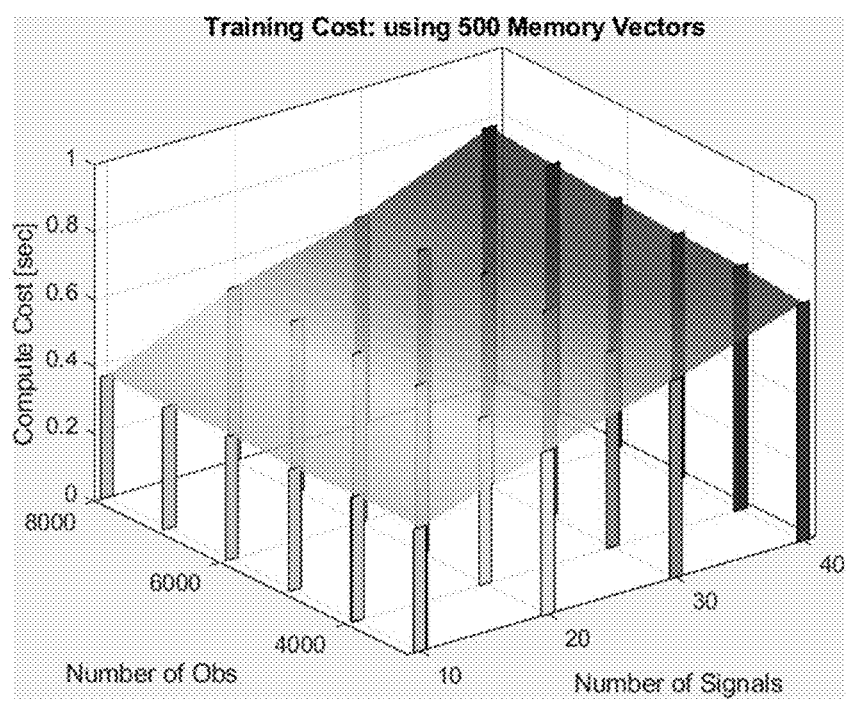
Figure 8A:
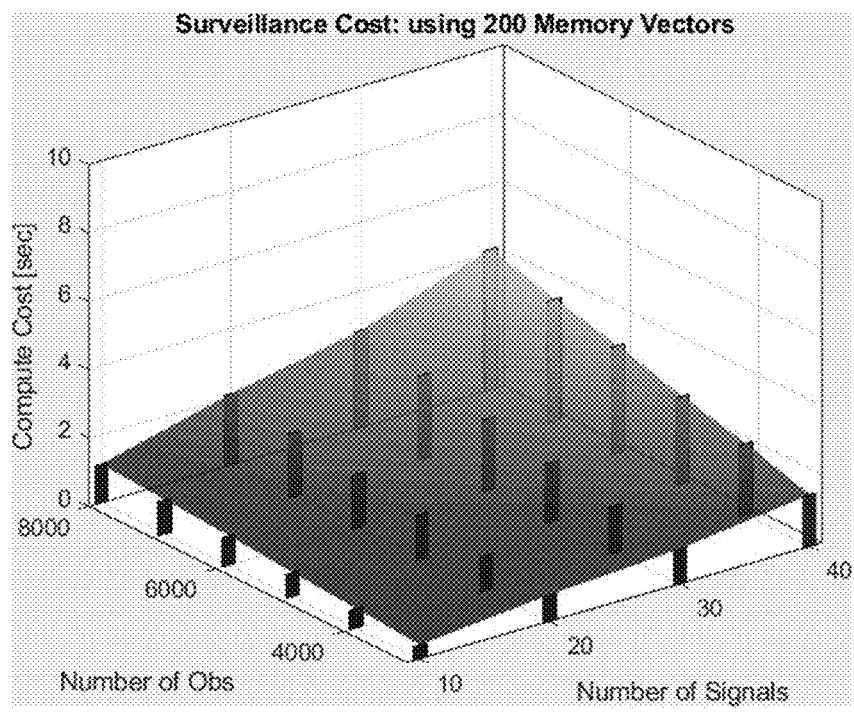
FIGS. 8A—D show example three-dimensional (3D) graphs generated to show the compute cost for streaming surveillance using MSET as a function of the number of observations and the number of signals.
Figure 8B:
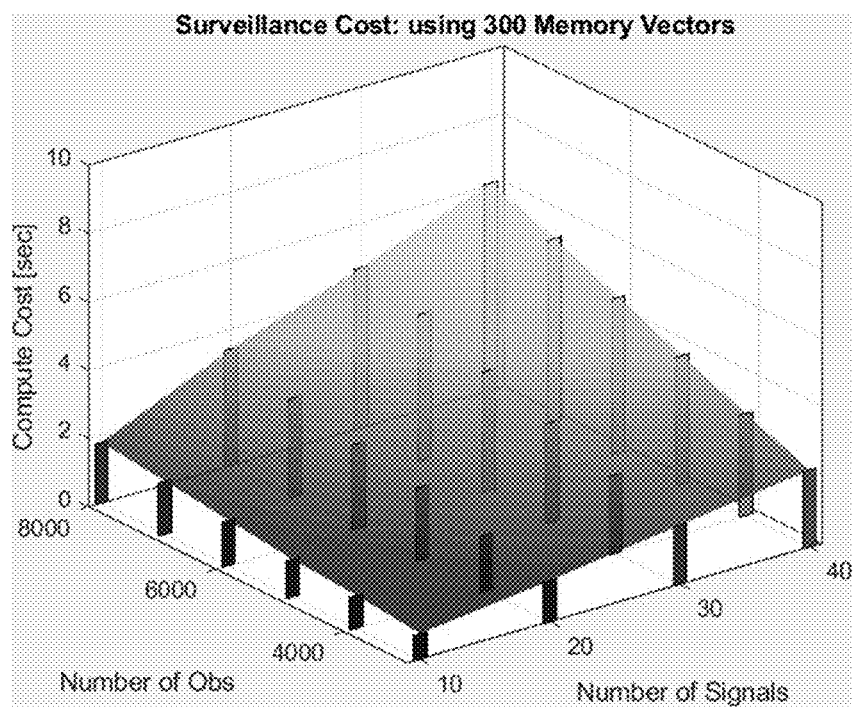
Figure 8C:
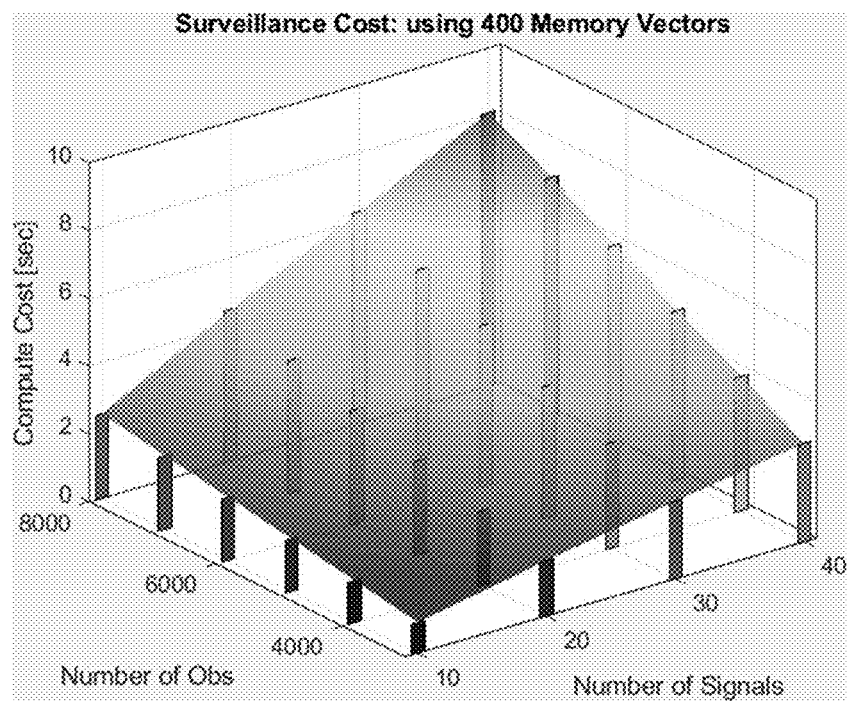
Figure 8D:
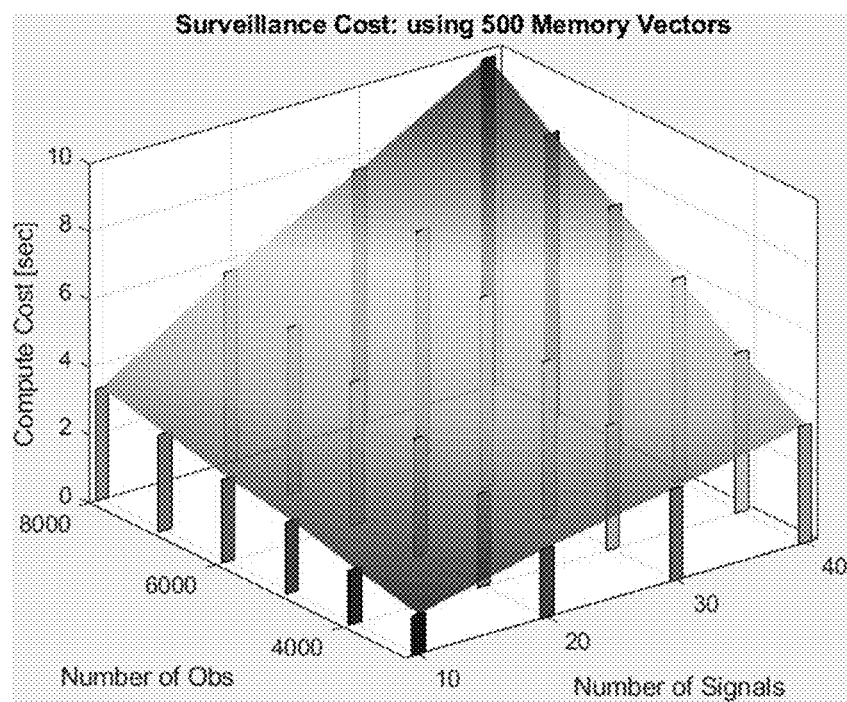

FIG. 4 shows one example 400 of method 300 for a particular use case associated with autonomous cloud-node scoping for big-data machine learning. In example method 400, the range of the number of signals is 10 signals to 100 signals, with an increment of 10 signals, as indicated by the initialization of the number of signals to 10 at process block 405, the determination as to whether the number of signals is less than 100 at decision block 410, and the addition of 10 to the number of signals at process block 415. The range of the number of observations (that is, the sampling rate or number of observations per unit time) is 10,000 observations to 100,000 observations, with an increment of 10,000 observations, as indicated by the initialization of the number of observations to 10,000 at process block 420, the determination as to whether the number of observations is less than 100,000 at decision block 425, and the addition of 10,000 to the number of observations at process block 430. The range of the number of training vectors (that is, the size of the training data set) is 100 training vectors to 2,500 training vectors, with an increment of 100 training vectors, as indicated by the initialization of the number of training vectors to 100 at process block 435, the determination as to whether the number of training vectors is less than 2,500 at decision block 440, and the addition of 100 to the number of training vectors at process block 445. In this example method 400, the machine learning application is a MSET application, as shown by process block 450. The compute cost for execution of the MSET application for each permutation of number of signals, number of observations, and number of training vectors is recorded by the processor in memory, as shown at process block 455. The compute cost for execution of the MSET application for each permutation of number of signals, number of observations, and number of training vectors is output by the processor from memory, as shown at process block 460. For example, the output may be in the form of graphical representations such as those shown and described with reference to FIGS. 5A-8D.

In one embodiment, the example 400 is performed by the automated scoping tool 103. The automated scoping tool 103 (in one embodiment, using the containerization module 141) accepts an input an MSET machine learning application as the pluggable machine learning application. The automated scoping tool 103 puts the MSET machine learning application in a candidate cloud container. The automated scoping tool 103 (in one embodiment, using the test execution module causes the containerized MSET machine learning application to be executed for possible combinations of a number of signals, observations for those signals, and sizes of training data set. In one embodiment, the automated scoping tool 103 runs through every possible such combination. In another embodiment, the combinations are selected at regular intervals over the breadth of each parameter, as dictated by increments associated with the parameter.

—Graphical Representation of Performance Information—

In one embodiment, the method 300 may further include steps for (i) generating one or more graphical representations that show the combinations of parameter values associated with the computational cost for each combination; and (ii) creating an instruction to display, on a graphical user interface, the one or more graphical representations to allow a selection of a configuration of central processing unit(s), graphics processing unit(s), and memory for the target cloud environment to execute the machine learning application.

In one example, the automated scoping tool is executed for a MSET machine learning prognostic technique in a candidate cloud container to determine how compute cost varies with respect to the number of signals, number of observations, and number of training vectors where MSET is employed as a cloud service, as in example method 400. In one embodiment, the results are presented as graphical representations of the information, such as bar plots and surface plots, showing the real compute cost measurements and the observed trending to scope out the cloud implementation of MSET. In one embodiment, the various presentations of results are presented as aids for a user of the automated scoping tool to select a shape for a container.

FIGS. 5A-D show example three-dimensional (3D) graphs generated to show the compute cost for a training process for the MSET machine learning technique as a function of the number of observations and the number of training vectors. The figures illustrate parametric empirical relationships between compute cost, number of memory vector, and number of observations for a training process for the MSET technique. The number of signals is specified in each individual FIGS. 5A, 5B, 5C, and 5D. Based on observation of the graphs, it can be concluded that the compute cost of a training process the MSET machine learning technique primarily depends on the number of memory vectors and number of signals.

FIGS. 6A-D show example three-dimensional (3D) graphs generated to show the compute cost for streaming surveillance using the MSET machine learning technique as a function of the number of observations and the number of training vectors. The figures illustrate parametric empirical relationships between compute cost, number of memory vectors, and number of observations for streaming surveillance using the MSET machine learning technique. The number of signals is specified in each individual FIGS. 6A, 6B, 6C, and 6D. It can be concluded that the compute cost of streaming surveillance primarily depends on the number of observations and number of signals.

FIGS. 7A-D show example three-dimensional (3D) graphs generated to show the compute cost for a training process for the MSET machine learning technique as a function of the number of observations and the number of signals. Thus, FIGS. 7A-D show alternative layouts of FIGS. 5A-D, with the compute cost vs. number of signals and number of observations in the training process for the MSET machine learning technique, while the number of memory vectors is specified in each individual FIGS. 7A, 7B, 7C, and 7D.

FIGS. 8A-D show example three-dimensional (3D) graphs generated to show the compute cost for streaming surveillance using the MSET machine learning technique as a function of the number of observations and the number of signals. Thus, FIGS. 8A-D show alternative layouts of FIGS. 6A-D, with the compute cost vs. number of signals and number of observations in streaming surveillance using the MSET machine learning technique, while the number of memory vectors is specified in each FIGS. 8A, 8B, 8C, and 8D.

Thus, the 3D results presented by the system show a user of the system a great deal of information about the performance in the target cloud environment of a selected machine learning application containerized in a selected compute shape (configuration of central processing unit(s), graphics processing unit(s), and memory). This enables a user of the system to rapidly evaluate the performance of the machine learning application in the selected compute shape. For example, the 3D results visually show the user the "compute cost" (the latency for the computations) for a machine learning application containerized with a particular compute shape for a given number for each of (i) sensors, (ii) observations (equivalent to the sampling rate of inputs to the machine learning application), and (iii) training vectors. In one embodiment, the system can present the 3D results for each of the compute shapes available for (appropriate for use in) a target cloud computing stack.

Further, for each of these compute shapes, the system may also calculate the dollar costs associated with the shapes and display them to the user. In one embodiment, the pricing is based on the quantity of time each aspect of the compute shape is made available for use. In one embodiment, where services are billed per hour, price for a given compute shape may be given as SHAPE_PRICE/hr= (CPU_QTY*CPU_Price/hr)+(GPU_QTY*GPU_Price/hr)+ (MEMORY_QTY*MEMORY_Price/hr). For example, a datacenter may charge $0.06 per hour for use of a CPU, $0.25 per hour for use of a GPU, and $0.02 per hour for use of 1 gigabyte of RAM. Thus, the datacenter will charge $1.14 per hour to operate a first example compute shape that has 8 CPUs, 2 GPUs, and 8 gigabytes of RAM; and will charge $3.28 per hour to operate a first example compute shape that has 16 CPUs, 6 GPUs, and 16 gigabytes of RAM.

At a minimum, presenting the user with the 3D results and dollar costs associated with a particular shape automatically presents the user with maximal information that would otherwise take the user a very long time to try to figure out from trial-and-error runs.

—Evaluation of Multiple Compute Shapes—

In one embodiment, the system evaluates the performance of the machine learning application for each of the set of shapes that may be deployed in the target cloud computing stack. This set may include a selection of shapes offered by the datacenter, or may include all possible combinations of shapes, or some other set of shapes for deployment in the target cloud computing stack. A user of the system can then select an appropriate compute shape for containerizing the machine learning application. For example:

(1) If all available compute shapes meet "compute cost" constraints (satisfying a target latency machine learning application for (i) the maximum number of signals, (ii) maximum sampling rate, and (iii) maximum number of training vectors, the system may recommend that the user select the compute shape with the lowest monetary cost.

(2) If some of the available compute shapes don't meet the "compute cost" constraints, the system may recommend the compute shape with the lowest monetary cost that also satisfies the "compute cost" constraints.

Further, the 3D results and costing information presented gives the user the information needed to evaluate reconfiguring the machine learning application, for example by reducing the number of sensors, or the number of observations (sampling rate), or back off on overall prognostic accuracy by reducing the number of training vectors. Without the results provided by the system, figuring out the tradeoffs between reducing number of signals, or number of observations, or number of training vectors to meet the user's compute-cost constraints involves uncertainty, guesswork, and weeks of trial-and-error experimentation. With the 3D curves and costing information provided by the system, a user can quickly decide, for example, "Let's throw out the 10 least helpful sensors" or "Let's back off our sampling rate by 8%" or "We have overkill on our prognostic accuracy, so let's cut the number of training vectors by 25%". This opportunity to tune model parameters to meet their own prognostic specifications has never before been available from a cloud provider for machine learning use cases.

In one embodiment, the repeated steps of setting, executing, and measuring repeated for each of multiple combinations of parameter values (steps 210, 215, and 220 discussed with reference to FIG. 2) are further reiterated for each of a set of available compute shapes for the target cloud environment.

Figure 9:
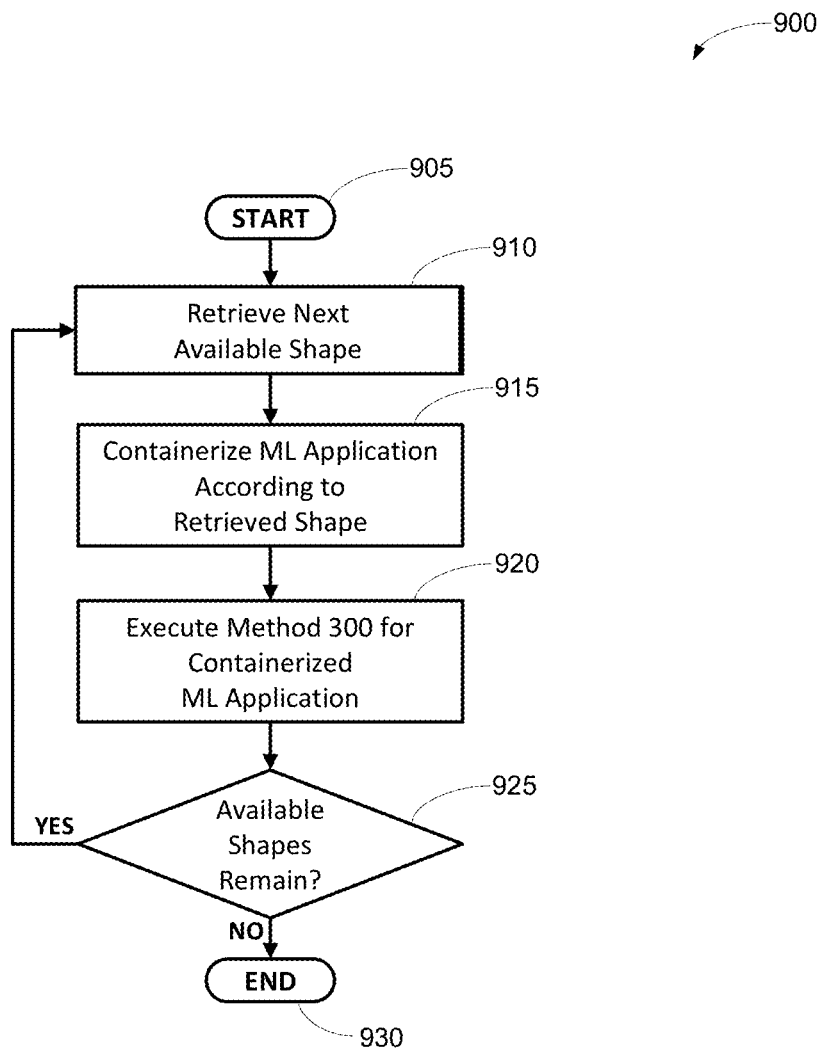
FIG. 9 illustrates one embodiment of a method associated with autonomous cloud-node scoping for big-data machine learning use cases for evaluating multiple compute shapes.

FIG. 9 illustrates one embodiment of a method 900 associated with autonomous cloud-node scoping for big-data machine learning use cases for evaluating multiple compute shapes. In one embodiment, the method 900 is an additional outermost loop is added to process 300, repeating for each of a set of compute shapes. The method 900 may be initiated based on various triggers, such as receiving a signal over a network or parsing stored data indicating that (i) a user (or administrator) of cloud computing system 100 has initiated method 900, (ii) method 900 is scheduled to be initiated at a defined time, or (iii) an automated process for migrating a machine learning application from a first computer system to a target cloud environment is being performed. The method 900 initiates at start block 905 in response to parsing a signal received or stored data retrieved and determining that the signal or stored data indicates that the method 900 should begin. Processing continues to process block 910.

At process block 910, the processor retrieves the next available compute shape from a set of compute shapes available for the target cloud environment. In one embodiment, the processor parses an address for a library of compute shapes that are appropriate for implementation on the target cloud computing environment. The library may be stored as a data structure in storage or memory. The library may be a table listing the configurations of the compute shape. The processor selects the next compute shape in the library that has not yet been evaluated during the execution of method 900. The processor stores the retrieved configuration for the compute shape in memory. Processing at process block 910 completes and processing continues at process block 315.

At process block 915, the processor containerizes the machine learning application according to the retrieved compute shape. In one embodiment, the processor parses the retrieved configuration to identify the specific configuration of the compute shape, including at least quantities of central processing unit(s) and graphics processing unit(s), as well as allocated memory. The processor then builds a test application container for the machine learning application according to the compute shape. For example, the processor may execute or call the functions of the containerization module 141 (as shown and described with reference to FIG. 1) to automatically build a container. The processor provides at least the machine learning application and the retrieved shape as inputs to the containerization module 141. The processor then causes containerization module 141 to automatically generates a containerized version of the machine learning application according to the retrieved compute shape. Processing at process block 915 completes and processing continues at process block 920.

At process block 920, the processor initiates process 300, performing the steps of that process for the containerized machine learning application, as shown and described with reference to FIG. 3 above. Process block 920 completes and processing continues at decision block 925.

At decision block 925, the processor determines whether any compute shapes remain unevaluated in the set of compute shapes available for the target cloud environment. For example, the processor may parse the next entry of the library to determine if the next entry describes another shape, or if the next entry is NULL, empty, or otherwise indicating no further shapes. If the next entry describes another shape (decision block 925: YES), processing returns to step 910, and method 900 repeats for the next compute shape.

Note that process block 365 (performed in process block 920) will causes the compute cost information for each compute shape to be output. In one embodiment, the compute cost information is output to memory in a data structure associated with the particular compute shape for later evaluation of the performance of that compute shape in executing the machine learning application.

If the next entry in the set of compute shapes indicates no further shapes (decision block 925: NO), processing at decision block 925 completes, and processing continues to end block 930, where method 900 ends.

Thus, in one embodiment, for each container shape of a set of container shapes, for each increment of a number of signals across a range of numbers of signals, for each increment of a sampling rate across a range of sampling rates, and for each increment of a number of training vectors across a range of numbers of training vectors, the processor executes the machine learning application according to the combination of the number of signals at the sampling rate with the number of training vectors in a container configured according to the container shape.

In one embodiment, the system and method assume that the user will automatically want to use the lowest-monetary-cost compute shape container that meets the user's performance constraints (in terms of target latency, target number of sensors, target number of observations or target sampling rate, and target number of training vectors). Here, after evaluating the performance of test applications of multiple compute shapes, the processor automatically presents the lowest cost option that satisfies the performance constraints. For example, the system and method may present the user with output that states "Shape C with n CPUs and m GPUs meets your performance requirements at a minimal cost of $8.22 per Hour." In this case, the processor ranks the feasible shapes that meet the customer's compute cost specifications (performance constraints), then picks the shape with the lowest monetary cost from the list of feasible shapes. In one embodiment, these steps of evaluation and ranking may be carried out by implementation of evaluation module 149 by the processor.

In one embodiment, the processor automatically configures a cloud container in the target cloud environment according to the recommended configuration. For example, this may be carried out by implementation of containerization module 141 by the processor for the machine learning application and the quantities of central processing unit(s), graphics processing unit(s), and allocated memory indicated by the recommended configuration or shape.

Figure 10:
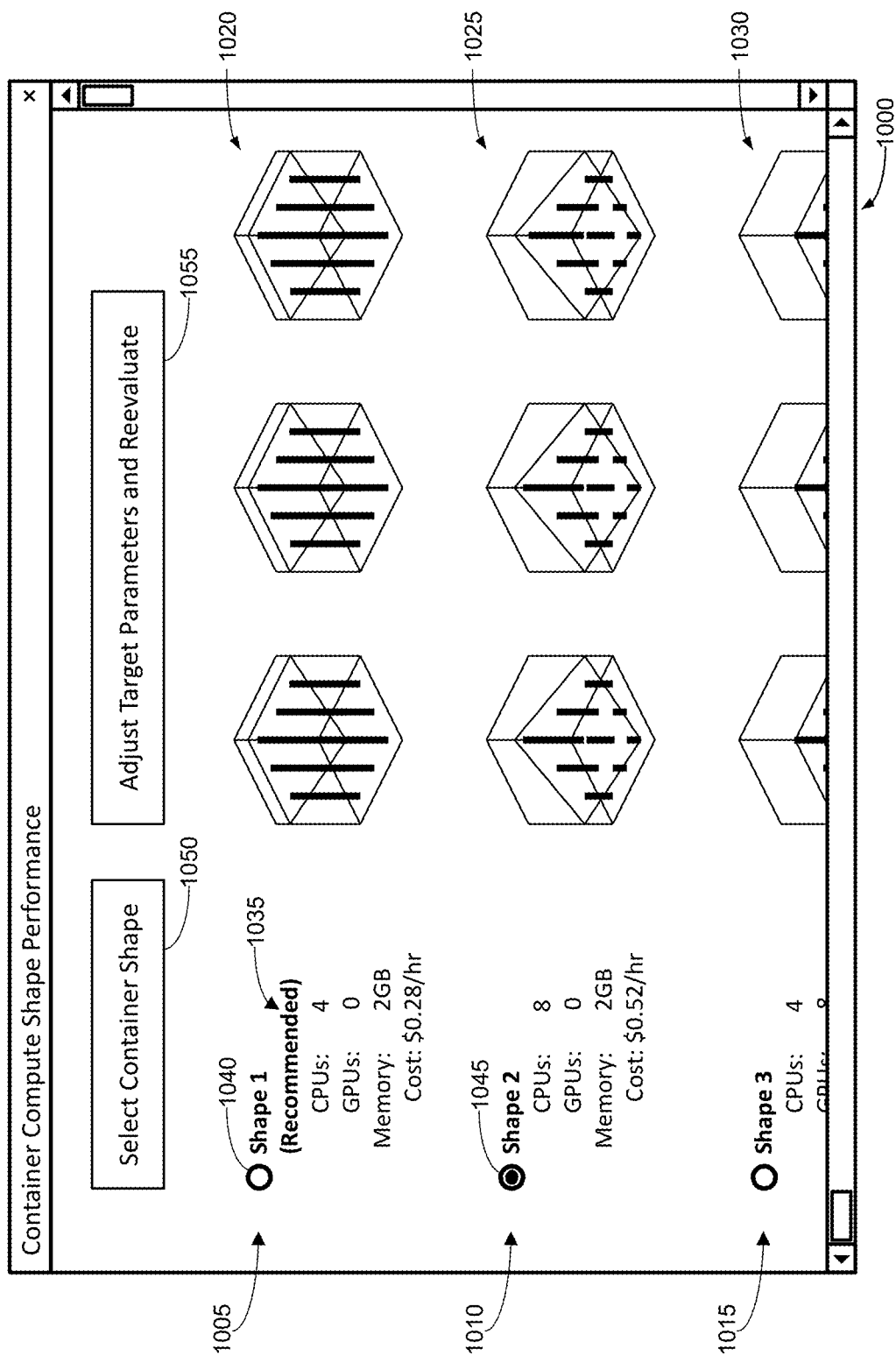
FIG. 10 shows one embodiment of an example GUI 1000 for presenting container shape, costing, and 3D performance information curves, and container shape recommendation.

In one embodiment, other members of the list of feasible container shapes (some or all) are presented to the user for selection. In one embodiment, the steps of these processes may be carried out by implementation of interface module 147 and evaluation module 149 by the processor. In one embodiment, the processor generates the one or more graphical representations that show the combinations of parameter values associated with the computational cost for each combination, and creates an instruction to display, on a graphical user interface, the one or more graphical representations to allow a selection of a configuration of central processing unit(s), graphics processing unit(s), and memory for the target cloud environment to execute the machine learning application. FIG. 10 shows one embodiment of an example GUI 1000 for presenting container shape, costing, and 3D performance information curves, and container shape recommendation. The example GUI 1000 has a series of rows 1005, 1010, 1015 that describe each feasible container shape. Additional rows describing further container shapes may be visible by scrolling downward in the GUI. Each of the rows 1005, 1010, 1015 also displays in the row sets of one or more graphical representations 1020, 1025, 1030 of the performance of the machine learning application in the particular container shape described by that row. For example, the graphical representations may be 3D graphs, such as those shown and described with reference to FIGS. 5A-8D.

Each of the rows describes the configuration information (in terms of quantities of CPUs, GPUs, and allocated memory) and costing information for that row (in terms of cost charged per unit time). In one embodiment, the rows are displayed in ascending order of a criteria, such as monetary cost, placing the least expensive feasible container shape in the top row. In one embodiment, the example GUI 1000 may show a specific indication 1035 that one particular container shape is recommended.

Each of the rows is associated with a means for indicating a selection of the container shape associated with that row, such as a radio button, check box, or other button. For example, the user of the GUI 1000 may choose not to select the recommended option by leaving radio button 1040 un-selected, and choose to select the next most expensive option, by selecting radio button 1045 (for example by mouse click). The user may then finalize this selection by selecting (for example by mouse click) "Select Container Shape" button 1050. Thus, in one embodiment, the user can enter the selection of the of the configuration by selecting the radio button adjacent to the description of the desired container shape and then selecting the "Select Container Shape" button 1050.

In one embodiment, in response to receiving the selection, the processor may automatically configure a cloud container in the target cloud environment according to the selected configuration. For example, this may be carried out by implementation of containerization module 141 for the machine learning application and the quantities of central processing unit(s) and graphics processing unit(s), as well as allocated memory indicated by the selected configuration or shape.

The GUI 1000 may also include an "Adjust Target Parameters and Reevaluate" button 1055. Selecting this button 1055 (for example, by mouse click) instructs the GUI 1000 to display an adjustment menu allowing the user to adjust the target parameters. For example, the user may be enabled to enter updated values for the target latency, the target number of signals, and or the target number of observations, the target number of training vectors into text fields. Alternatively, the values of these variables may be adjusted by graphical sliders, buttons, knobs, or other graphical user interface elements. An "accept and reevaluate" button may be included in the adjustment menu. Selection of the "accept and reevaluate" button will cause the processor to reevaluate the performance data for the various container shapes in view of the new target parameters. In one embodiment, the steps of these processes may be carried out by implementation of interface module 147 and evaluation module 149 by the processor.

Thus, the system and method spans the range of customer sophistication from those customers who want the maximum detailed information (unavailable from any other approach) to enable adjustment of the numbers of signals, observations, and training vectors to arrive at a satisfactory cost, through the customers who simply want to be told what shape meets all the required performance specifications for the customer's prognostic machine learning application at the lowest monetary cost.

—Cloud or Enterprise Embodiments—

In one embodiment, the automated scoping tool 103 and/or other systems shown and described herein are a computing/data processing system including a database application or collection of distributed database applications. The applications and data processing system may be configured to operate with or be implemented as a cloud-based networking system, a software-as-a-service (SaaS) architecture, a platform-as-a-service (PaaS) architecture, an infrastructure-as-a-service (IaaS) architecture, or other type of networked computing solution. In one embodiment the cloud computing system 100 is a server-side system that provides at least the functions disclosed herein and that is accessible by many users via computing devices/terminals communicating with the cloud computing system 100 (functioning as the server) over a computer network.

—Software Module Embodiments—

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing specific tasks, processes, functions, or operations. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

—Computing Device Embodiment—

Figure 11:
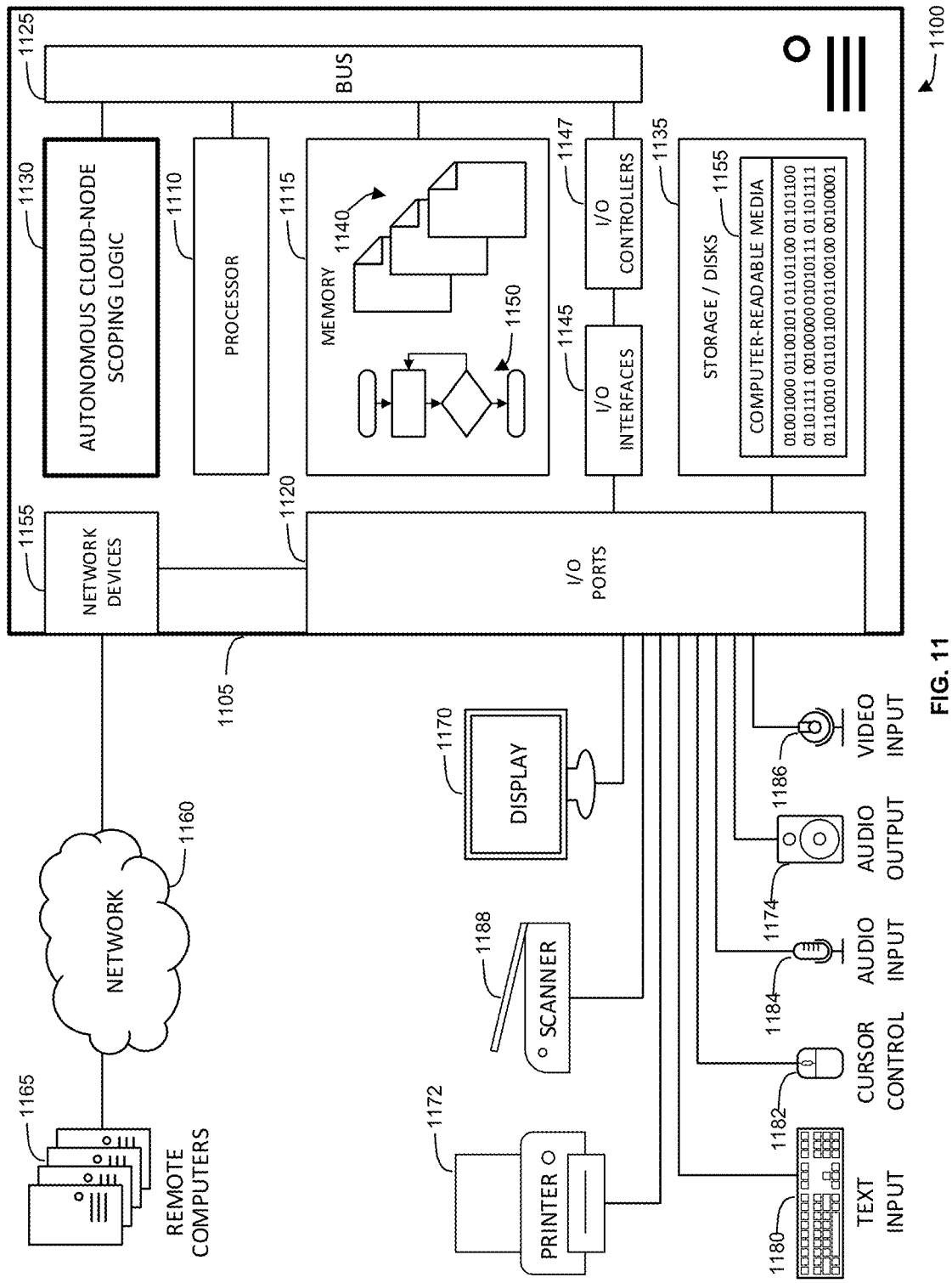
FIG. 11 illustrates an embodiment of a computing system configured with the example systems and/or methods disclosed.

FIG. 11 illustrates an example computing device that is configured and/or programmed with one or more of the example systems and methods described herein, and/or equivalents. The example computing device may be a computer 1105 that includes a processor 1110, a memory 1115, and input/output ports 1120 operably connected by a bus 1125. In one example, the computer 1105 may autonomous cloud node scoping logic 1130 configured to facilitate autonomous cloud-node scoping for big-data machine learning use cases (for example, determining an appropriate compute shape of a cloud container for a machine learning application), similar to the logic, systems, and methods shown and described with reference to FIGS. 1-10. In different examples, the logic 1130 may be implemented in hardware, a non-transitory computer-readable medium with stored instructions, firmware, and/or combinations thereof. While the logic 1130 is illustrated as a hardware component attached to the bus 1125, it is to be appreciated that in other embodiments, the logic 1130 could be implemented in the processor 1110, stored in memory 1115, or stored in disk 1135.

In one embodiment, logic 1130 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to automate process discovery and facilitation. The means may also be implemented as stored computer executable instructions that are presented to computer 1105 as data 1140 that are temporarily stored in memory 1115 and then executed by processor 1110.

Logic 1130 may also provide means (e.g., hardware, non-transitory computer-readable medium that stores executable instructions, firmware) for performing automated process discovery and facilitation.

Generally describing an example configuration of the computer 1105, the processor 1110 may be a variety of various processors including dual microprocessor and other multi-processor architectures. A memory 1115 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 1135 may be operably connected to the computer 1105 via, for example, an input/output interface (e.g., card, device) 1145 and an input/output port 1120 that are controlled by at least an input/output (I/O) controller 1147. The disk 1135 may be, for example, a magnetic disk drive, a solid-state disk drive, a floppy disk drive, a tape drive, a Zip drive, a flash memory card, a memory stick, and so on. Furthermore, the disk 1135 may be a CD-ROM drive, a CD-R drive, a CD-RW drive, a DVD ROM, and so on. The memory 1115 can store a process 1150 and/or a data 1140, for example. The disk 1135 and/or the memory 1115 can store an operating system that controls and allocates resources of the computer 1105.

The computer 1105 may interact with input/output devices by way of the input/output (I/O) controller 1147, the input/output (I/O) interfaces 1145 and the input/output ports 1120. Input/output devices may be, for example, a keyboard, a microphone, a pointing and selection device, cameras, video cards, displays, the disk 1135, the network devices 1155, and so on. The input/output ports 1120 may include, for example, serial ports, parallel ports, and USB ports.

The computer 1105 can operate in a network environment and thus may be connected to the network devices 1155 via the I/O interfaces 1145, and/or the I/O ports 1120. Through the network devices 1155, the computer 1105 may interact with a network 1160. Through the network 1160, the computer 1105 may be logically connected to remote computers 1165. Networks with which the computer 1105 may interact include, but are not limited to, a LAN, a WAN, and other networks.

The computer 1105 can control one or more output devices, or be controlled by one or more input devices, through I/O ports 1120. The output devices include one or more displays 1170, printers 1172 (such as inkjet, laser, or 3D printers), and audio output devices 1174 (such as speakers or headphones). The input devices include one or more text input devices 1180 (such as keyboards), cursor controllers 1182 (such as mice, touchpads, or touch screens), audio input devices 1184 (such as microphones), and video input devices 1186 (such as video and still cameras).

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.

EEPROM: electrically erasable PROM.

USB: universal serial bus.

WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, comprising:
    for each of multiple combinations of parameter values,
        (i) setting a combination of parameter values describing a usage scenario,
        (ii) executing a machine learning application in a candidate cloud container according to the combination of parameter values on a target cloud environment, and
        (iii) measuring computational cost for the execution of the machine learning application in the candidate cloud container; and
    generating a recommendation regarding configuration of central processing unit(s), graphics processing unit(s), and memory for the target cloud environment to execute the machine learning application based on the measured computational costs for the candidate cloud container, wherein the machine learning application causes a non-linear relationship between the combinations of parameter values and the computational costs.

2. The method of claim 1, further comprising:
    simulating a set of signals from one or more sensors; and
    providing the set of signals to the machine learning application as an input to the machine learning application during the execution of the machine learning application.

3. The method of claim 1, wherein the combinations of parameter values are combinations of:
a value for a number of signals from one or more sensors;
a value for a number of observations streaming per unit time; and
a value for a number of training vectors to be provided to the machine learning application.

4. The method of claim 1, further comprising:
generating one or more graphical representations that show the combinations of parameter values associated with the computational cost for each combination; and
creating an instruction to display, on a graphical user interface, the one or more graphical representations to allow a selection of a configuration of central processing unit(s), graphics processing unit(s), and memory for the target cloud environment to execute the machine learning application.

5. The method of claim 1, further comprising automatically configuring a cloud container in the target cloud environment according to the recommended configuration.

6. The method of claim 1, wherein the combination of parameter values is set according to a Monte Carlo simulation, further comprising providing the parameter values to the machine learning application as inputs to the machine learning application during the execution of the machine learning application.

7. The method of claim 1, further comprising reiterating for each of a set of available configurations of central processing unit(s), graphics processing unit(s), and memory for the target cloud environment the steps of setting, executing, and measuring repeated for each of multiple combinations of parameter values.

8. A non-transitory computer-readable medium storing computer-executable instructions that when executed by at least a processor of a computer cause the computer to:
for each of multiple combinations of parameter values,
(i) set a combination of parameter values describing a usage scenario,
(ii) execute a machine learning application in a candidate cloud container according to the combination of parameter values on a target cloud environment, and
(iii) measure computational cost for the execution of the machine learning application in the candidate cloud container; and
generate a recommendation regarding configuration of central processing unit(s), graphics processing unit(s), and memory for the target cloud environment to execute the machine learning application based on the measured computational costs for the candidate cloud container, wherein the machine learning application causes a non-linear relationship between the combinations of parameter values and the computational costs.

9. The non-transitory computer-readable medium of claim 7, further comprising instructions that when executed by at least the processor cause the computer to:
simulate a set of signals from one or more sensors; and
provide the set of signals to the machine learning application as an input to the machine learning application during the execution of the machine learning application.

10. The non-transitory computer-readable medium of claim 7, wherein the combinations of parameter values are combinations of:
a value for a number of signals from one or more sensors;
a value for a number of observations streaming per unit time; and
a value for a number of training vectors to be provided to the machine learning application.

11. The non-transitory computer-readable medium of claim 7, further comprising instructions that when executed by at least the processor cause the computer to:
generate one or more graphical representations that show the combinations of parameter values associated with the computational cost for each combination; and
create an instruction to display, on a graphical user interface, the one or more graphical representations to allow a selection of a configuration of central processing unit(s), graphics processing unit(s), and memory for the target cloud environment to execute the machine learning application.

12. The non-transitory computer-readable medium of claim 7, further comprising instructions that when executed by at least the processor cause the computer to automatically configure a cloud container in the target cloud environment according to the recommended configuration.

13. The non-transitory computer-readable medium of claim 7, wherein the combination of parameter values are set according to a Monte Carlo simulation, further comprising further comprising instructions that when executed by at least the processor cause the computer to provide the parameter values to the machine learning application as inputs to the machine learning application during the execution of the machine learning application.

14. A computing system, comprising:
a processor;
a memory operably coupled to the processor;
a non-transitory computer-readable medium storing computer-executable instructions that when executed by at least a processor accessing memory cause the computing system to:
for each of multiple combinations of parameter values,
(i) set a combination of parameter values describing a usage scenario,
(ii) execute a machine learning application in a candidate cloud container according to the combination of parameter values on a target cloud environment, and
(iii) measure computational cost for the execution of the machine learning application in the candidate cloud container; and
generate a recommendation regarding configuration of central processing unit(s), graphics processing unit(s), and memory for the target cloud environment to execute the machine learning application based on the measured computational costs for the candidate cloud container, wherein the machine learning application causes a non-linear relationship between the combinations of parameter values and the computational costs.

15. The computing system of claim 13, wherein the computer-readable medium further comprises instructions that cause the computing system to:
for each container shape of a set of container shapes,
for each increment of a number of signals across a range of numbers of signals,
for each increment of a sampling rate across a range of sampling rates, and
for each increment of a number of training vectors across a range of numbers of training vectors,
execute the machine learning application according to the combination of the number of signals at the sampling rate with the number of training vectors in a container configured according to the container shape.

16. The computing system of claim 13, wherein the combinations of parameter values are combinations of:
a value for a number of signals from one or more sensors;
a value for a number of observations streaming per unit time; and
a value for a number of training vectors to be provided to the machine learning application.

17. The computing system of claim 13, wherein the computer-readable medium further comprises instructions that cause the computing system to:
generate one or more graphical representations that show the combinations of parameter values associated with the computational cost for each combination;
create an instruction to display, on a graphical user interface, the one or more graphical representations to allow a selection of a configuration of central processing unit(s), graphics processing unit(s), and memory for the target cloud environment to execute the machine learning application; and
in response to receiving the selection, automatically configure a cloud container in the target cloud environment according to the selected configuration.

* * * * *

UNITED STATES PATENT AND TRADEMARK OFFICE
CERTIFICATE OF CORRECTION

| | |
|---|---|
| PATENT NO. | : 11,367,018 B2 |
| APPLICATION NO. | : 16/732558 |
| DATED | : June 21, 2022 |
| INVENTOR(S) | : Wetherbee et al. |

It is certified that error appears in the above-identified patent and that said Letters Patent is hereby corrected as shown below:

In the Claims

In Column 29, Lines 54-55, in Claim 9, delete "claim 7," and insert --claim 8,--

In Column 29, Line 63, in Claim 10, delete "claim 7," and insert --claim 8,--

In Column 30, Line 4, in Claim 11, delete "claim 7," and insert --claim 8,--

In Column 30, Lines 15-16, in Claim 12, delete "claim 7," and insert --claim 8,--

In Column 30, Line 21, in Claim 13, delete "claim 7," and insert --claim 8,--

In Column 30, Line 55, in Claim 15, delete "claim 13," and insert --claim 14,--

In Column 31, Line 3, in Claim 16, delete "claim 13," and insert --claim 14,--

In Column 31, Line 10, in Claim 17, delete "claim 13," and insert --claim 14,--

Signed and Sealed this
Ninth Day of August, 2022

Katherine Kelly Vidal
*Director of the United States Patent and Trademark Office*